United States Patent [19]
Boyer

[11] 3,758,646
[45] Sept. 11, 1973

[54] HALOGEN CONTAINING PHOSPHORUS MONOOLS

[75] Inventor: Nicodemus E. Boyer, Parkersburg, W. Va.

[73] Assignee: Borg-Warner Corporation, Chicago, Ill.

[22] Filed: July 16, 1970

[21] Appl. No.: 55,575

[52] U.S. Cl........... 260/953, 260/2.5 AR, 260/75 P, 260/77.5 AR, 260/928, 260/929, 260/940, 260/942, 260/960, 260/45.95
[51] Int. Cl........ C07f 9/08, C07f 9/40, C08g 22/44
[58] Field of Search............................ 260/953, 950

[56] References Cited
UNITED STATES PATENTS

| | | | |
|---|---|---|---|
| 3,333,028 | 7/1967 | Larrison | 260/953 X |
| 3,463,837 | 8/1969 | Friedman | 260/953 X |

*Primary Examiner*—Lewis Gotts
*Assistant Examiner*—Anton H. Sutto
*Attorney*—Cushman, Darby & Cushman

[57] ABSTRACT

Novel halohydrocarbyl mono hydroxy containing phosphites and phosphonates are prepared. They can be converted to fire resistant polyurethanes or used as stabilizers and fire retardant additives in various compositions.

36 Claims, No Drawings

HALOGEN CONTAINING PHOSPHORUS MONOOLS

The present invention relates to novel organic phosphites and phosphonates.

The organic phosphites and phosphonates of the present invention are all characterized by having a single hydroxyl group. This hydroxyl group is not on a carbon atom adjacent to a phosphorus atom and is normally linked to the phosphorus atom through a plurality of atoms terminating in an oxygen atom which is directly attached to the phosphorus atom. The phosphites and phosphonates are further characterized by having at least one halogen atom of atomic weight not over 80 attached to a carbon atom attached either directly or indirectly to a phosphorus atom. Preferably the compounds have a plurality of such halogen atoms.

The compounds of the present invention are useful in preparing flame resistant and fire retardant polyesters and polyurethanes. They take part in the reaction forming the polyester or polyurethane and surprisingly even though they are monofunctional, i.e. they have only one hydroxyl group. They do not interfere with the reaction of poly-functional alcohols in reacting with polybasic acids to form polyesters or in reacting with polyisocyanates to form polyurethanes. On the other hand because they take part in the reaction they are permanently bound in the product and cannot be leached out or otherwise removed in the manner that non-reactive halogenated phosphites or phosphonates can be removed.

The novel phosphites and phosphonates also can be used in other formulations, e.g. in amounts 0.1–10 percent by weight of the polymer as stabilizers against oxidation, light and other polymer degradation for polyvinyl chloride, and other vinyl chloride polymers, e.g. vinyl chloride-vinylidene chloride copolymer (80:20), vinyl chloride-vinyl acetate (87:13), vinyl chloride-acrylonitrile (85:15). In the same proportions they are also stabilizers for monoolefin polymers such as polyethylene, polypropylene, ethylene-propylene copolymers (e.g. 50:50, 80:20 and 20:80), ethylene monoolefin copolymers wherein the monoolefin has four to 10 carbon atoms and is present in a minor amount, e.g. ethylene-butene-1 copolymer (e.g. 95:5) and ethylene-decene-1 copolymer. Furthermore, they can be used in the same amounts to stabilize natural rubber, styrene-butadiene rubber, ethylene-propylene-nonconjugated diene terpolymers, e.g. ethylene-propylene-dicyclopentadiene terpolymer (e.g. 57:42:3), poly cis isoprene, poly cis butadiene, as well as ABS (acrylonitrile-butadiene-styrene) polymer.

The various types of phosphites and phosphonates which are suitable for use in the invention will be discussed in more detail below.

Unless otherwise indicated, all parts and percentages are by weight.

It should be realized that almost all of the compounds of the present invention exist as a mixture of several isomeric forms. Thus the starting dipropylene glycol is commercially available as a mixture of isomers. Similarly many of the halogenated starting materials employed or prepared consist of a plurality of isomers.

In the Arbuzov rearrangement of phosphites to phosphonates there can be used any desired haloalkane such as ethylene dichloride, 2-chloroethanol, chloroform, bromoform, carbon tetrachloride, carbon tetrabromide, octyl fluoride, octyl chloride, octyl bromide, 1,2-dichloropropane, 1,2-dibromopropane, 1,3-dichloropropane, 1,4-dichlorobutane. These halogen compounds can be added in either catalytic amounts, e.g. 0.1 mole per mole of bis(alkyl) diol phosphite (or bis(haloalkyl) diol phosphite) or they can be used in equimolar amounts. In the rearrangement, the haloalkane will react to replace a part of the alkyl or haloalkyl groups, depending on the amount of haloalkane and its boiling point.

It has been found that bis haloalkyl halophosphites such as bis-(2-chloroethyl) phosphorochloridite, bis-(2-bromoethyl) phosphorochloridite, bis(3-chloropropyl) phosphorochloridite, bis(2,3-dichloropropyl) phosphorochloridite react in equimolar proportions with diols, e.g. glycols such as ethylene glycol, propylene glycol, trimethylene glycol, tetramethylene glycol, 1,2-butylene glycol, 1,3butylene glycol, diethylene glycol, dipropylene glycol, triethylene glycol, tripropylene glycol or the like to form phosphites having a single hydroxyl group such as bis(2-chloroethyl) hydroxyethyl phosphite, bis (2-chloroethyl) hydroxypropyl phosphite, bis(2-chloroethyl) 4'-hydroxybutyl phosphite, bis(2-chloroethyl)2'-hydroxybutyl phosphite, bis(2-chloroethyl) hydroxyethoxyethyl phosphite, bis(2-chloro-ethyl) hydroxypropoxypropyl phosphite, bis(2-chloroethyl) hydroxy di(ethoxy) ethyl phosphite, bis(2-chloroethyl) hydroxy di(propoxy) propyl phosphite, bis(2-chloroethyl) hydroxy tri(ethoxy) ethyl phosphite, bis(2-chloroethyl) hydroxy tri(propoxy) propyl phosphite, bis(2-bromoethyl) hydroxy di(ethoxy) ethyl phosphite, bis(2,3-dichloropropyl) hydroxyethyl phosphite, bis(2,3-dibromopropyl) hydroxypropoxypropyl phosphite, bis(2-chloroethyl) hydroxyhexyl phosphite. In the reaction hydrogen chloride is eliminated in the form of a salt, e.g. as tertiary amine hydrochloride such as triethylamine hydrochloride. An alternative method for preparing compounds of the above type is to react tris(haloalkyl) phosphites with an equimolar amount of the diol and remove 1 mole of chlorohydrin, e.g. by distillation. The reaction can be carried out in the presence of alkali as a catalyst, e.g. 0.1 mole of sodium methylate. The compounds formed have the formula

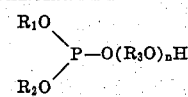

where $R_1$ and $R_2$ are haloalkyl, $R_3$ is alkylene of two to six carbon atoms and $n$ is an integer such as 1, 2, 3 or 4. $R_1$ and $R_2$ can also be haloaryl such as chlorophenyl, bromophenyl, pentachlorophenyl, dichloronaphthyl or the like. Such compounds are formed for example by reacting

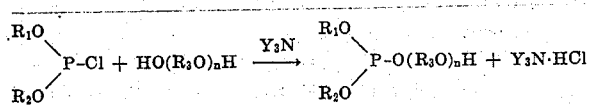

where $Y_3N$ is a tertiary amine. Alternatively the compounds can be formed by the reaction

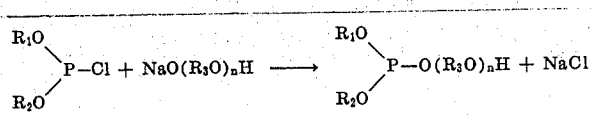

Examples of such compounds are bis(chlorophenyl) hydroxyethyl phosphite, bis(pentachlorophenyl) diethylene glycol phosphite, bis(2,3-dibromophenyl) dipropylene glycol phosphite, bis(2,4-dichloronaphthyl) hydroxypropyl phosphite.

Phosphonates analogous to the above phosphites can be prepared by a conventional Arbuzov rearrangement of the phosphite by heating in the presence of an alkyl halide (it being remembered that the haloaryl groups will not undergo the Arbuzov rearrangement).

Thus there can be formed 2-chloroethyl hydroxyethyl 2-chloroethane phosphonate, 2-chloroethyl hydroxypropyl 2-chloroethane phosphonate, 2-chloroethyl 4'-hydroxybutyl 2-chloroethane phosphonate, 2-chloroethyl 2'-hydroxybutyl 2-chloroethane phosphonate, 2-chloroethyl hydroxyethoxyethyl 2-chloroethane phosphonate, 2-chloroethyl hydroxypropoxypropyl 2-chloroethane phosphonate, 2-chloroethyl hydroxydi-(ethoxy)ethyl 2-chloroethane phosphonate, 2-chloroethyl hydroxydi-(propoxy)propyl 2-chloroethane phosphonate, 2-chloroethyl hydroxy tri(ethoxy)ethyl 2-chloroethane phosphonate, 2-chloroethyl hydroxytri(propoxy)propyl 2-chloroethane phosphonate, 2-bromoethyl hydroxydi(ethoxy)ethyl 2-bromoethane phosphonate, 2,3-dichloropropyl hydroxyethyl 2,3-dichloropropane phosphonate, 2,3-dibromopropyl hydroxypropoxypropyl 2,3-dibromopropane phosphonate, 2-chloroethyl hydroxyhexyl 2-chloroethanephosphonate.

By reacting one mole chloroethyl phosphorodichloridite with 2 moles of propylene oxide there is formed 2-chloroethyl bis(2-chloropropyl) phosphite. Transesterification of this with diols, e.g. diethylene glycol, dipropylene glycol, tripropylene glycol or the other diols set forth above by heating below 100° C. forms ethylene chlorohydrin as the by-product and bis(2-chloropropyl) hydroxyethoxyethyl phosphite, bis(2-chloropropyl) hydroxypropoxypropyl phosphite, bis(2-chloropropyl) hydroxydi(propoxypropyl) phosphite, bis(2-chloropropyl) hydroxybutyl phosphite, bis(2-chloropropyl) hydroxypropyl phosphite. Similar bromine analogues are formed starting from 2-boromoethyl phosphorodibromidite, e.g. bis(2-bromopropyl) hydroxyethoxyethyl phosphite. These compounds upon heating to 100°–150°C. rearrange into the corresponding phosphonates by Arbuzov rearrangement to form 2-chloropropyl hydroxypropoxypropyl 2-chloropropane phosphonate, 2-chloropropyl hydroxyethoxyethyl 2-chloropropane phosphonate, 2-chloropropyl 2-hydroxybutyl 2-chloropropane phosphonate, 2-bromopropyl hydroxyethoxyethyl 2-bromopropane phosphonate (as well as isomers).

EXAMPLE 1

Bis(2-chloroethyl) hydroxyethoxyethyl phosphite.

One mole (225.5 gr.) of bis(2-chloroethyl) phosphorochloridite (made from 1 mole of phosphorus trichloride and 2 moles of ethylene oxide at 35°–40°C. in 10 hours) was reacted with 1 mole (106.1 g.) of diethylene glycol and 1 mole (101 g.) of triethylamine in 1 liter of diethyl ether to form 1 mole of triethylamine hydrochloride which was filtered off and 1 mole of bis(2-chloroethyl) hydroxyethoxyethyl phosphite ((ClCH$_2$CH$_2$O—)$_2$P—OCH$_2$CH$_2$OCH$_2$CH$_2$OH) as a colorless liquid in 100 percent yield (C 32.72%, H 5.93%, Cl 24.00%, P 10.38%).

EXAMPLE 2

Bis(2-chloroethyl) hydroxyethoxyethyl phosphite.

530.6 grams (5 moles) of diethylene glycol were placed in a flask under a nitrogen atmosphere. The glycol was heated to 113°C. and 1347.5 grams (5 moles) of tris(2-chloroethyl) phosphite added gradually over a period of 2 hours at a temperature of 94°–113°C. while removing the 2-chloroethanol formed in the reaction by distillation at a pressure of about 43–63 mm. The residue was bis(2-chloroethyl) hydroxyethoxyethyl phosphite, a colorless liquid C 32.71%, H 6.00%, P 10.61%, Cl 23.96% (O 26.72% by difference) in a yield of 1437.6 grams, $d_4^{25.4}$ 1.280.

EXAMPLE 3

Bis(2-chloroethyl) hydroxypropoxypropyl phosphite. 670.9 grams (5 moles) of dipropylene glycol were placed in a flask under a nitrogen atmosphere. The dipropylene glycol was heated to 125°C. and 1347.5 grams (5 moles) of tris(2-chloroethyl) phosphite added gradually. The temperature dropped to 112°C. and was kept at 102°–112°C. for about 1.5 hours while removing the 2-chloroethanol formed by distillation. The residue in an amount of 1576.8 grams was bis(2-chloroethyl) hydroxypropoxypropyl phosphite, a clear very pale yellow liquid, C 37.54%, H 6.94%, P 8.87%, Cl 20.30%; $d_4^{25}$ 1.160. The iodine number of 69.55 to 69.30 as against a theoretical of 78.5 shows that there was little rearrangement to the corresponding phosphonate. The iodine number is calculated as $$(I_2/\text{Mol. Wt.}) \times 100 = \text{iodine number}$$

since the reaction is

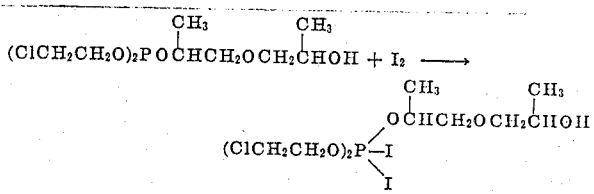

EXAMPLE 4

2.5 moles of bis(2-chloroethyl) hydroxyethoxyethyl phosphite with 2.5 moles of carbon tetrachloride were refluxed for about 9.5 hours at 85°C. residue temperature. Then volatiles were removed for 0.5 hours at 760 mm. and a vapor temperature of 71°C. and then for about 0.75 hours at a vapor temperature of 38°C. and pressure of 69 mm. to a vapor temperature of 59°C. and pressure of 23 mm. The residue was a mixture of 2-chloroethyl hydroxyethoxyethyl trichloromethane phosphonate with some 2-chloroethyl hydroxyethoxyethyl 2-chloroethane phosphonate, unreacted bis(2-chloroethyl) hydroxyethoxyethyl phosphite and some dimer formed by splitting out 2-chloroethanol. The product was useful in making fire retardant polyurethane foams.

EXAMPLE 5

2.5 moles of bis(2-chloroethyl) hydroxyethoxyethyl phosphite and 2.5 moles of ethylene dichloride were refluxed for 9.5 hours at about 103°C. residue temperature. Then the volatiles were distilled off. There were collected 240.3 grams distilling at 88°–94°C. at 760 mm. and 101.9 grams distilling at 44°C. and 85 mm. to 67°C. and 49 mm. The residue was 2-chloroethyl hydroxyethoxyethyl 2-chloroethane phosphonate as a nearly clear colorless liquid $d_4^{28}$ 1.315 iodine number 56.32 to 56.26 indicating that there was present some unreacted bis(2-chloroethyl) hydroxyethoxyethyl phosphite as well. The yield was 593.3 grams. The completeness of the rearrangement is denoted by the decrease in iodine number from that of the starting phosphite. In other runs at a higher temperature, a complete rearrangement to the phosphonate (with the iodine number zero) was obtained.

EXAMPLE 6

2.322 moles of bis(2-chloroethyl) hydroxypropoxypropyl phosphite was refluxed with 1.161 moles of carbon tetrachloride for about 9.5 hours at about 112°C. residue temperature. The volatiles were distilled first at atmospheric pressure at 70°–80°C. and then at reduced pressure ending at 62°C. and 39 mm. The residue of 677.0 grams was a nearly clear, colorless liquid comprising primarily a mixture of about equal parts of 2-chloroethyl hydroxypropoxypropyl trichloromethane phosphonate and 2-chloroethyl hydroxypropoxypropyl 2-chloroethane phosphonate together with some unreacted starting phosphite and some dimer. The dimer was formed by the reaction

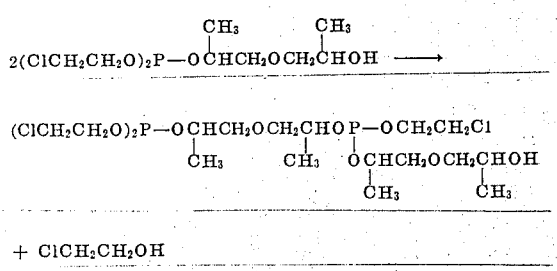

The iodine number of 26.35 to 26.84 shows that there was substantial rearrangement to the phosphonates since the starting phosphite material employed had an iodine number of 69.30 to 69.55.

EXAMPLE 7

2.322 moles of bis(2-chloroethyl) hydroxypropoxypropyl phosphite were refluxed with 2.322 moles of ethylene dichloride for 9.5 hours at a residue temperature of about 110°C. The volatiles were distilled first at 86 to 91°C. at 760 mm. and then in a vacuum at a temperature up to 78°C. at 57 mm. The residue of 62.42 grams was a nearly clear, colorless liquid $d_4^{28}$ 1.2245 having an iodine number of 50.08 to 50.96. It contained a substantial amount of 2-chloroethyl hydroxypropoxypropyl 2-chloroethane phosphonate together with some unreacted starting phosphite and some dimer tris(2-chloroethyl) bis(dipropylene glycol) diphosphite (as well as dimer phosphonate). As will be appreciated longer refluxing time results in an increase in phosphonate and a reduction in the remaining starting phosphite.

EXAMPLE 8

Example 3 was repeated using 10 moles of tris(2-chloroethyl) phosphite and 10 moles of dipropylene glycol to obtain 3,209.4 grams of bis(2-chloroethyl) hydroxypropoxypropyl phosphite as a clear, colorless liquid, iodine number 66.29, C 37.12%, H 6.42%, P 9.35%, Cl 21.92%.

EXAMPLE 9

5.12 moles of bis(2-chloroethyl) hydroxypropoxypropyl phosphite prepared in Example 8 were refluxed with 1.28 moles (126.7 grams) of ethylene dichloride at 129°–137°C. for a little over 11 hours. Then 101.4 grams were removed by distillation and refluxing continued for another 27.5 hours at 139°–142°C. The remaining ethylene dichloride was then distilled off. The product was 2-chloroethyl hydroxypropoxypropyl 2-chloroethane phosphonate and analyzed, C 36.90%, H 6.49%, P 9.5%, Cl 21.91%. The yield was 1590.2 grams and the iodine number was 9.24 indicating very little starting phosphite had not undergone rearrangement to phosphonate.

EXAMPLE 10

Bis(2,3-dichloropropyl) phosphorochloridite was prepared by adding 1.178 moles of epichlorohydrin to 0.589 mole of $PCl_3$ (i.e. a mole ratio of 2:1) during 1 hour at 25°–50°C. followed by heating the mixture for 1 hour at 70°C. (C 22.8%, H 3.17%, Cl 52.94%, P 9.06%). Then 79.0 grams (0.589 mole) of dipropylene glycol was added to the bis(2,3-dichloropropyl) phosphorochloridite under the nitrogen during 1 hour and 23 minutes at 66°–79°C. Heating was continued at 70°–75°C. for 1 additional hour and then for 2 hours at 130°–135°C. The pressure was reduced to 21–24 mm. and the mixture heated further. The distillate coming over at 103°–105°C. was primarily 2,3-dichloropropanol. The liquid residue was primarily 2,3-dichloropropanol. The liquid residue was primarily bis(2,3-dichloropropyl) 6-hydroxy-4-oxahept-2-yl phosphite in an amount of 169.6 grams, iodine number 67.4; C 32.75%, H 5.57%, Cl 37.52%, P 9.29%.

EXAMPLE 11

287.1 grams (0.692 mole) of tris(2,3-dichloropropyl) phosphite were mixed with 92.9 grams (0.692 mole) of dipropylene glycol at 25°C. and then heated for 0.5 hour to 122°C. under nitrogen. The 2,3-dichloropropanol formed was removed by distillation at 108°–117°C. at 71–72.5 mm. In all 96.7 grams of distillate were removed during 1 hour and 50 minutes. The bis(2,3-dichloropropyl) hydroxypropoxypropyl phosphite formed as a residue was 279.0 grams of a colorless, slightly viscous liquid, iodine number 30.68, C 33.25%, H 5.62%, Cl 35.67%, P 6.37%. The relatively low iodine number indicated that a portion of the phosphite had converted to 2,3-dichloropropyl hydroxypropoxypropyl 2,3-dichloropropane phosphonate.

EXAMPLE 12

116 grams (0.283 mole) of the bis(2,3-dichloropropyl) hydroxypropoxypropyl phosphite prepared in Example 11 was heated at 150°C. for 11.5 hours. The 2,3-dichloropropyl hydroxypropoxypropyl 2,3-dichloropropane phosphonate formed was recovered as a clear, nearly colorless liquid in an amount of 110 grams, iodine number 7.65, C 33.48%, H 5.20%, Cl 35.39%, P 6.50%. The drop in iodine number as compared to that of the product of Example 11 indicated the increase in rearrangement to the phosphonate.

EXAMPLE 13

1160.0 grams (0.283 mole) of bis(2,3-dichloropropyl) hydroxypropoxypropyl phosphite having an iodine number of 30.68 and prepared in Example 11 were mixed with 3.2 grams of ethylene chloride and refluxed for about 18.75 hours at 150°C. The ethylene chloride was distilled off to leave as the residue 2,3-dichloropropyl hydroxy propoxypropyl 2,3-dichloropropane phosphonate, a nearly clear, colorless liquid in a yeild of 103.8 grams, iodine number 6.10, C 35.81%, H 5.59%, Cl 34.95%, P 7.45%.

EXAMPLE 14

The procedure of Example 3 was repeated by mixing 918.0 grams (3.405 moles) of tris(2-chloroethyl) phosphite with 457.0 grams (3.405 moles) of dipropylene glycol at 25°C. and then heating to distill out the 2-chloroethanol formed at the water pump at a residue temperature up to 108°C. at 33 to 18 mm. to obtain 278.6 grams of 2-chloroethanol. The residue was bis(2-chloroethyl) hydroxypropoxypropyl phosphite, a very pale yellow liquid weighing 1,073.7 grams, iodine number 73.62, C 37.53%, H 6.63%, P 8.81%, Cl 22.28%.

EXAMPLE 15

999.0 grams (3.705 moles) of tris(2-chloroethyl) phosphite and 393.2 grams (3.705 moles) of diethylene glycol were mixed at 75°C. in a nitrogen atmosphere and then heated. The 2-chloroethanol formed was removed by distillation up to 115°C. residue temperature using water pump vacuum. 313.4 grams of distillate were removed. The bis(2-chloroethyl) hydroxyethoxyethyl phosphite residue in an amount of 1054.8 grams was clear and colorless, had an iodine number of 80.27 (theory86) and analyzed C 33.79%, H 6.19%, P 9.98%, Cl 22.50 %.

EXAMPLE 16

2193.0 grams (8.14 moles) of tris (2-chloroethyl) phosphite were mixed with 900.3 grams (8.14 moles) of 3-chloro-1, 2-propanediol at room temperature. The mixture was heated under nitrogen to a residue temperature of 70°C. at water pump vacuum and there were removed 647.0 grams of 2-chloroethanol by distillation. There were obtained 2,421.4 grams of product, primarily bis(2-chloroethyl) 2-hydroxy-3-chloropropyl phosphite as a clear, pale orange liquid, iodine number 61.93 (theory 85.9), C 28.62%, H 4.84%, Cl 32.67%, P 10.58. Some of the isomeric product bis(2-chloroethyl) 1'-chloromethyl-2'-hydroxyethyl phosphite was also present.

EXAMPLE 17

455.1 grams (1.097 moles) of tris(2,3-dichloropropyl) phosphite were mixed with 116.5 grams (1.097 moles) of diethylene glycol at 25°C. and heated up to 119°C. residue temperature while distilling off the 2,3-dichloro-1-propanol formed at 72 to 84°C. at 27 to 22 mm. The distillate was 101.8 grams (about 72% of theory). The residue was a clear, colorless liquid containing 459.0 grams and was bis(2,3-dichloropropyl) hydroxyethoxyethyl phosphite mixed with some starting tris(23-dichloropropyl) phosphite. It had an iodine nmber of 55.27 (theory 64.7) and C 31.23% H 5.02%, Cl 37.50% P 7.25%.

EXAMPLE 18

2,746.8 grams (8.5 moles) of bis(2-chloroethyl) hydroxypropoxypropyl phosphite were heated with 84.1 grams (.85mole of ethylene dichloride in a nitrogen atmosphere for 1.75 hours at reflux 145°–150°C. The product at this point had an iodine number of 29 showing partial transformation to 2-chloroethyl hydroxypropoxypropyl 2-chloroethane phosphonate. The product was then refluxed for 6.25 hours at 760 mm. The residue was 2-chloroethyl hydroxypropoxypropyl 2-chloroethane phosphonate, iodine number 16.29, C 37.84%, H 6.69%, P 8.97%, Cl 20.72%.

EXAMPLE 19

2,804.0 grams (9.5 moles) of bis(2-chloroethyl) hydroxyethoxyethyl phosphite were mixed with 94.0 grams (0.95 mole) of ethylene dichloride at 25°C. and heated to reflux under nitrogen at 140°–150°C. for 9 hours. The iodine number was 16.40 indicating substantial rearrangement to 2-chloroethyl hydroxyethoxyethyl 2-chloroethane phosphonate. The product was refluxed a further 7 hours at 140°C. Then the ethylene dichloride was distilled off at 760 mm. to give 101.8 grams of distillate. The residue was a nearly clear, colorless slightly viscous liquid in an amount of 2,777.2 grams, iodine number 13.29, C 32.54%, H 5.86%, P 10.69%, Cl 25.35% which indicated that most of the phosphite had rearranged to the phosphonate.

EXAMPLE 20

Bis(2-chloroethyl) hydroxypropoxypropyl phosphite was prepared by mixing 3,233.9 grams (12 moles) of tris (2-chloroethyl) phosphite with 1,610.0 grams (12 moles) of dipropylene glycol. The mixture was heated to a pot temperature of 80°–85°C. at 49–32 mm. while distilling off the 2-chloroethanol by-product for 3 hours at which time 979.5 grams of distillate collected. The residue was a clear, light yellow liquid weighing 3,884.0 grams, Cl 21.91%, (theory 21.94), iodine number 71.9 (theory 78.5).

EXAMPLE 21

Bis(2-chloroethyl) hydroxyethoxyethyl phosphite was prepared by mixing 3,773.0 grams (14.0 moles) of tris (2-chloroethyl) phosphite and 1,486.8 grams (14.0 moles) of diethylene glycol and distilling off the 2-chloroethanol by-product for 3.5 hours at 23 mm. and 65°–83°C. The distillate weighed 1140 grams. The residue was a clear, pale yellowish liquid weighing 4,109.8 grams, Cl 23.47%, iodine number 76.34 (theory 86.0).

EXAMPLE 22

A 2-chloroethyl hydroxyethoxyethyl trichloromethane phosphonate mixture like that obtained in Example 4 was obtained by heating 914.8 grams (3.1 moles) of tris(2-chloroethyl) phosphite with 476.8 grams (3.1 moles) of carbon tetrachloride under nitrogen at a reflux temperature of 90°C. for 8 hours and then distilling out 391.2 grams of volatiles (carbon tetrachloride and ethylene dichloride) at 870 mm. and 66 to 86°C. (vapor) and up to a 153°C. residue temperature in 2 hours. The residue contained 991.2 grams and had an iodine number of 12.9 indicating that most of the starting phosphite had been transformed to phosphonate.

EXAMPLE 23

560.83 grams (1.8 moles) of tris(2-chloropropyl) phosphite were mixed with 191.16 grams (1.8 moles) of diethylene glycol at 25°C. and heated under nitrogen at the water pump to distill off the 2-chloro-1-propanol by-product as it formed. It was heated for 1.5 hours up to 78°C. residue temperature. The distillate (vapor) temperature was 50°–62°C. at 23–61 mm. and the distillate amounted to 181.9 grams. The residue was bis(2-chloropropyl) hydroxyethoxyethyl phosphite, a clear, colorless, slightly viscous liquid obtained in an amount of 562.1 grams, iodine number 75.73 (theory 78.5), C 37.01%, H 6.71%, Cl 21.28%, P 9.75%.

EXAMPLE 24

275.0 grams (0.851 mole) of bis(2-chloropropyl) hydroxyethoxyethyl phosphite and 8.4 grams (0.0851 mole) of ethylene dichloride were mixed and heated under nitrogen to reflux at 160°–165°C. for 12.5 hours. Then the ethylene dichloride and the 1,2-dichloropropane formed were distilled off at up to 77°C. residue temperature. The 2-chloropropyl hydroxyethoxyethyl 2-chloropropane phosphonate was obtained as a clear, colorless liquid in an amount of 255.9 grams, iodine number 14.63, C 34.91%, H 6.15%, Cl 27.34%, P 10.29%.

EXAMPLE 25

Bis(2-chloropropyl) hydroxypropoxypropyl phosphite was prepared by heating equimolar amounts of tris(2-chloropropyl) phosphite and dipropylene glycol and distilling off the 2-chloro-1-propanol formed in a manner analogous to Example 23. To 310.0 grams (0.883 mole) of bis(2-chloropropyl) hydroxypropoxypropyl phosphite there were added 8.7 grams (0.883 mole) of ethylene dichloride and the mixture heated under reflux in a nitrogen atmosphere at slow reflux for 13 hours at 155°–160°C. The ethylene dichloride (and the 1,2-dichloropropane formed) were removed by distillation up to 160°C. The residue was 2-chloropropyl hydroxypropoxypropyl 2-chloropropane phosphonate, a nearly clear colorless liquid obtained in a yield of 292.9 grams, iodine number 12.64 (theory zero), C 40.37%, H 7.23%, Cl 19.94k %, P 8.76%.

EXAMPLE 26

140.0 grams (0.433 mole) of bis(2-chloropropyl) hydroxyethoxyethyl phosphite was mixed with 6.7 grams (0.043 mole) of carbon tetrachloride and heated to 150°C. under nitrogen at reflux for 13.5 hours. Then the residual $CCl_4$ and 1,2-dichloropropane formed were removed by distillation. The residual product was a nearly clear, colorless slightly viscous liquid weighing 136.8 grams having an iodine number of 17.90. It was a mixture of about 10 mole per cent 2-chloropropyl hydroxy ethoxyethyl trichloromethane phosphonate and about 90 mole per cent of 2-chloropropyl hydroxyethoxyethyl 2-chloropropane phosphonate (based on total phosphonate). There was also a small amount of residual starting material. The analysis was C 34.88%, H 6.07%, Cl 22.14%, P 10.31%.

EXAMPLE 27

150.0 grams (0.427 mole) of bis(2-chloropropyl) hydroxypropoxypropyl phosphite were mixed with 6.6 grams (0.0427 mole) of $CCl_4$. The mixture was refluxed in a nitrogen atmosphere at 150°C. for 12 hours. Residual $CCl_4$ and 1,2-dichloropropane formed were removed by distillation. The product was mainly 2-chloropropyl hydroxypropoxypropyl 2-chloropropane phosphonate with a small amount (not over 10 percent) 2-chloropropyl hydroxypropoxypropyl trichloromethane phosphonate and a small amount of starting phosphite; iodine number 12.24, C 39.61%, H 6.90%, Cl 20.37%, P 43%.

EXAMPLE 28

268.3 grams (2.0 moles) of dipropylene glycol were mixed with 1 liter of diethyl ether (solvent) and 202.0 grams (2.0 moles) of triethylamine (acid aceptor) at 25°C. Then 450.9 grams (2.0 mole of bis(2-chloroethyl) phosphorochloridite in 350 ml. of diethyl ether were added dropwise during 2 hours at 25°–30°C. while maintaining the mixture in a nitrogen atmosphere. The white precipitate of triethylamine hydrochloride was removed by filtration. The filtrate was concentrated on a flash evaporator to remove the ether to obtain bis(2-chloroethyl) hydroxypropoxypropyl phosphite as a colorless liquid in an amount of 666.7 grams, iodine number 62.10 (theory 78.6), C 38.84%, H 7.18%, Cl 21.06%, P 7.98%.

EXAMPLE 29

3,772.9 grams (14 moles) of tris (2-chloroethyl) phosphite and 1,485.7 grams (14 moles) of diethylene glycol were mixed at 25°C. and then heated as set forth in Example 21 but at a pot temperature of 80°–90°C. using a water pump pressure of 65–45 mm. 1,172.0 grams of 2-chloroethanol distillate was formed. The yield of bis(2-chloroethyl) hydroxyethoxyethyl phosphite was 4,045.4 grams, Cl 22.57%, iodine number 81.04.

EXAMPLE 30

1829.6 grams (6.2 moles) of bis(2-chloroethyl) hydroxyethoxyethyl phosphite and 953.6 grams (6.2 moles) of carbon tetrachloride were mixed and refluxed at 95°C. for 5.75 hours to an iodine number of 16.17. The mixture was then refluxed for a further 7 hours at 95°C. and then distilled at 760 mm. up to 153°C. residue temperature in 3 hours. The distillate came over at 72°–82°C., mostly at about 76°C. and amounted to 777.5 grams. The residue was nearly clear, colorless, slightly viscous liquid weighing 1,897.8 grams and having an iodine number of 3.64, was a mixture of primarily 2-chloroethyl hydroxyethoxyethyl trichloromethane phosphonate with some 2-chloroethyl hydroxyethoxyethyl 2-chloroethane phosphonate and some phosphonate dimer. C 29.54%, H 4.93%, Cl 29.14%, P 10.76%.

EXAMPLE 31

2,262.1 grams (7.0 moles) of bis(2-chloroethyl) hydroxypropoxypropyl phosphite and 1,076.6 grams (7.0 moles) of $CCl_4$ were heated under nitrogen at 95°C. reflux for 4 hours to an iodine number of 14.22. Reflux was continued for another 7 hours at about 95°–100°C. and then distillate was removed at 760 mm. at up to 152°C. residue temperature. About 732.2 grams of distillate were obtained in 4 hours. The residue was a nearly clear, colorless, slightly viscous liquid weighing 2,334.2 grams, iodine number 6.43. It was a mixture of primarily 2-chloroethyl hydroxypropoxypropyl trichloromethane phosphonate with some 2-chloroethyl hydroxypropoxypropyl 2-chloroethane phosphonate and some phosphonate dimer.

Example 32

2,136.0 grams (8 moles) of tris(22-chloroethyl) phosphite and 368.0 grams (4 moles) of glycerine were placed in a flask in a nitrogen atmosphere and heated under water pump vacuum for about 1.75 hours at a pot temperature of 67°-72°C. and a vapor temperature of 53°-55°C. and a pressure of 50-37 mm. There were obtained 689.2 grams of 2-chloroethanol distillate. The residue was a golden brown liquid in an amount of 1,846.0 grams and was a mixture of the isomeric compounds tetra(2-chloroethyl)2-hydroxypropylene diphosphite and tetra(2-chloroethyl) 1-hydroxypropylene diphosphite. The reaction proceeds as follows:

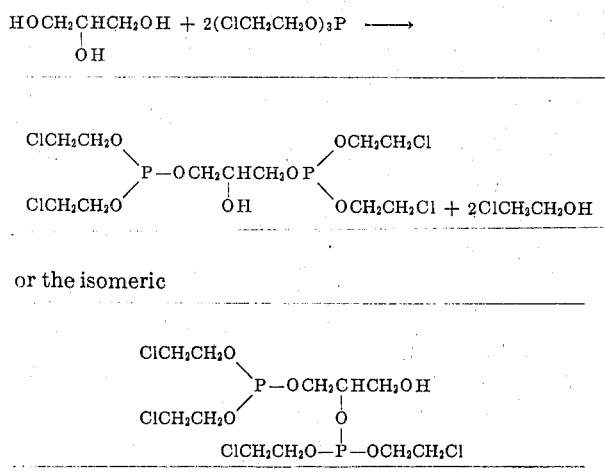

In a similar way there can be prepared tetra (2-bromoethyl 2-hydroxypropylene diphosphite, tetra(2,3-dichloropropyl) 2-hydroxypropylene diphosphite, tetra (2,3-dichloropropyl) 1-hydroxypropylene diphosphite. By replacing the glycerine with trimethylolethane, trimethylolpropane or 1,2,6-hexanetriol analogous compounds percent prepared including tetra (2'-chloroethyl) 2-hydroxymethyl 2-methyl propylene diphosphite, tetra (2'-chloroethyl) 2-hydroxymethyl-2-ethyl propylene diphosphite, tetra (2'-bromoethyl) 2-hydroxymethyl-2-methyl propylene diphosphite, tetra (2',3'-dichloropropyl) 2-hydroxymethyl-2-methyl propylene diphosphite, tetra (2'-chloroethyl) 6-hydroxy-1,2-hexylene diphosphite, tetra (2'-chloroethyl) 2-hydroxy-1,6-hexylene diphosphite, tetra (2'-fluoroethyl) 2-hydroxypropylene diphosphite.

Likewise the corresponding phosphonates of the trimethylolethane diphosphites, trimethylolpropane diphosphites and hexanetriol diphosphites can be prepared in the manner set forth above.

EXAMPLE 33

450.9 grams (2.0 moles) of bis(2-chloroethyl) phosphorochloridite and 0.35 liter of diethyl ether were added dropwise over a period of 2 hours under nitrogen into a mixture of 212.2 grams (2.0 moles) of diethylene glycol and 202.0 grams (2.0 moles) of triethylamine while maintaining the temperature at 25 to 30°C. with an ice-water bath. The mixture was filtered to remove the triethylamine hydrochloride. The filtrate was flash evaporated to remove the ether and obtain bis(2-chloroethyl) hydroxyethoxyethyl phosphite as a clear, colorless liquid in a yield of 647.0 grams, iodine number 64.63, C 34.46%, H 6.36%, Cl 23.40%, P 8.23%.

EXAMPLE 34

2,677.9 grams (9.0 moles) of bis(2-chloropropyl) 2-chloroethyl phosphite was mixed with 955.1 grams (9.0 moles) of diethylene glycol at 25°C. under a nitrogen atmosphere and then distilled at a residue temperature of 60°-77°C. for 1.75 hours and a distillate temperature of 60°-63°C. at 57.5-48 mm. to obtain 727.0 grams of 2-chloroethanol. The clear, golden-yellow residue weighed 2,903.0 grams, had an iodine number of 70.21 (theory 78.5) and was bis(2-chloropropyl) hydroxyethoxyethyl phosphite, C 35.72%, H 6.43%, Cl 27.49%, P 9.90%.

EXAMPLE 35

696.5 grams of bis(2-chloropropyl) hydroxyethoxyethyl phosphite prepared in Example 34 was heated in a nitrogen atmosphere at 150°-160°C. for 6 hours to get an iodine number of 14.7. It was heated for 6 more hours at 155°C. The liquid product weighed 897.0 grams, had an iodine number of 12.60 and analyzed C 34.37%, H 5.85%, Cl 21.80%, P 10.26% and was primarily 2-chloropropyl hydroxyethoxyethyl 2-chloropropane phosphonate with a small amount of dimer phosphonate and non-rearranged phosphite.

EXAMPLE 35(a)

Bis (2-chloroprophyl) hydroxypropoxypropyl Phosphite 560.83 grams (1.8 moles) of tris (2-chloropropyl) phosphite and 241.52 grams of dipropylene glycol were mixed at room temperature. The mixture was heated gradually in 2 hours to a maximum residual temperature of 100° C., while removing 177.3 grams (1.87 moles) of 2-chloro-1-propanol by distillation at a vapor temperature of 53° C./44 mm. to 67° C./58 mm.

The residue contained dipropylene glycol bis (2-chloropropyl) phosphite as the main product. It was obtained as a clear, colorless liquid, yield 627.8 grams (99percent). It analyzed C 41.00% (theory 41.02%), H 7.20 (theory 7.18%),
Cl 20.21% (theory 20.18%), P 8.85% (theory 8.82%),
Oxygen (by difference)22.74% (theory 22.80%),
Iodine number 69.3 (theory 72.2).

The iodine number showed that the phosphite had not rearranged to the corresponding phosphonate during the reaction.

EXAMPLE 35(b)

2-chloropropyl hydroxypropoxypropyl 2-chloropropane phosphonate

The product of example 35(a) was rearranged to the corresponding phosphonate by heating for 10 hours at 150°-180° C. After this heating period the iodine number was reduced to 0.8 indicating only traces of the phosphite were left and the rest had been converted to 2-chloropropyl dipropylene glycol 2-chloropropane phsophonate, a clear, colorless liquid.

Both the phosphite of Example 35(a) and the phosphonate of Example 35(b) were successfully tested in polyurethane foams. The optimum phosphorus level for self-extinguishing to non-burning rigid foams with good physical properties was 0.5–0.7percetn P in the final foam composition, and for self-extinguishing flexible polyurethane foams, 1 percent P in the final composition.

Hexachlorocyclopentadiene, hexabromocyclopentadiene and hexafluorocyclopentadiene react with vinyl 2-chloroethyl ether in the Diels-Alder reaction (or with the corresponding vinyl 2-bromoethyl ether or vinyl 2-fluoroethyl ether) to form 1,4,5,6,7,7-hexachloro-5-norbornen-2-yl 2-chloroethyl ether (or its bromine-containing or fluorine-containing analogues). These compounds when heated with tertiary phosphites of the formula $(R_5O)_3P$ form phosphonates of the formula:

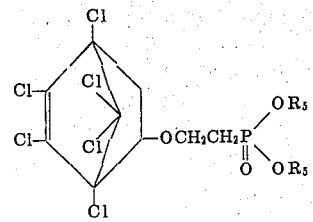

or in general

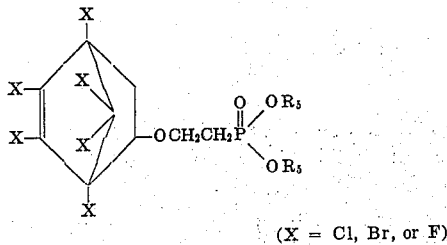

(X = Cl, Br, or F)

This compound can then be reacted with an equimolar amount of a diol $HO(R'O)_nH$ to produce a monohydric phosphonate. Alternatively a one-step reaction can be employed as has been shown in preparing other compounds within the present invention by replacing the $(R_5O)_3P$ by $(R_5O)_2P O(R'O)_nH$.

In a specific illustration

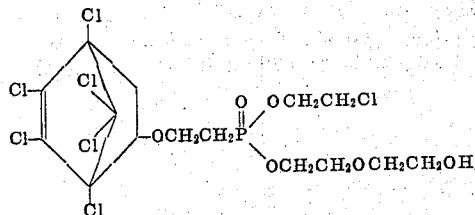

is prepared by reacting one mole of the hexachloronorbornenyl 2-chloroethyl ether with bis(2-chloroethyl) hydroxyethoxyethyl phosphite. In similar fashion there are prepared methyl hydroxypropoxypropyl 1,4,5,6,7,-7-hexachloro-5-norbornen-2-oxyethane phosphonate, 2-bromoethyl hydroxydiethoxyethyl hexabromonorbornenoxyethane phosphonate, 3-chloroethyl 4-hydroxybutyl hexafluoronorbornenoxyethane phosphonate.

EXAMPLE 36

Hexachloronorbornenyl chloroethyl ether.

136.4grams (0.5mole) of hexachlorocyclopentadiene and 0.6 grams of 2,6-di-t-butyl-4-methylphenol (polymerization inhibitor) were placed in a flask. At room temperature under a nitrogen atmosphere there were added 52.8 grams (0.495 mole) of vinyl 2-chloroethyl ether. The mixture was heated at 115°–144°C. for 6hours. The product was then distilled, first at the water pump to remove volatiles at a temperature up to 130°C. and then in a high vacuum. The cut boiling at 107°C. at 0.135 mm. to 120°C. at 0.16 mm. and weighing 130.7 grams was collected. The analysis was C 28.53%, H 1.82%, Cl 65.59%, 0 (by difference) 3.95% which coincides closely with the theoretical values for $C_9H_7OCl_7$, hexachloronorbornenyl chloroethyl ether.

Tris(2-chloroethyl) phosphite heated mole for mole with N,N-dimethylaniline (45°–70°C.) in xylene as a solvent dehydrochlorinates to bis(2-chloroethyl) vinyl phosphite. Heating this compound with hexachlorocyclopentadine gives bis (2-chloroethyl) 1,4,5,6,7,7-hexachloro-5-norbornen-2yl phosphite. Transesterification of this on a mole to mole basis with dipropylene glycol by heating below 100°C. with alkaline catalyst gives 2-chloroethyl hydroxypropoxypropyl 1,4,5,6,7,7-hexachloro-5-norbornen-2-yl phosphite of the formula

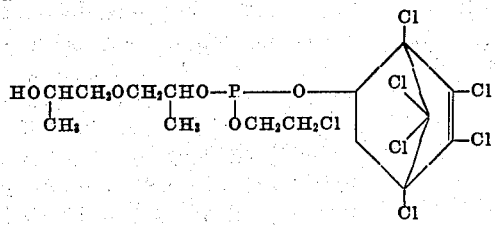

(and ethylene chlorohydrin as the by-product).

By using any of the other diols set forth above and/or tris(2-bromoethyl phosphite there are obtained similar mono hydroxy phosphites such as 2-chloroethyl hydroxyethoxyethyl 1,4,5,6,7,7-hexachloro-5-norbornen-2yl phosphite, 2-chloroethyl hydroxydi(ethoxy)ethyl 1,4,5,6,7,7-hexachloro-5-norbornen-2-yl phosphite, 2-bromoethyl hydroxydi(propoxy)propyl 1,4,5,6,7,7-hexachloro-5-norbornen-2yl phosphite. Using hexabromocyclopentadiene there are obtained analogous compounds such as 2-chloroethyl hydroxypropoxypropyl 1,4,5,6,7,7-hexabromo-5-norbornen-2-yl phosphite and 2-bromoethyl hydroxyethoxyethyl 1,4,5,6,7,7-hexabromo-5-norbornen-2-yl phosphite.

When the transesterification with the diol is carried out with heating above 100°C. (either with or without $ClCH_2CH_2Cl$ as a catalyst) rearrangement to the corresponding phosphonate occurs. Thus heating bis(2-chloroethyl 1,4,5,6,7,7-hexachloro-5-norbornen-2-yl phosphite to 140°C. with an equimolar amount of diethylene glycol gives hydroxyethoxyethyl 1,4,5,6,7,7-hexachloro-5-norbornen-2-yl 2-chloroethane phosphonate. Similarly there are obtained hydroxypropoxypropyl 1,4,5,6,7,7-hexachloro-5-norbornen-2-yl 2-chloroethane phosphonate, hydroxydiethoxyethyl 1,4,-5,6,7,7-hexachloro-5-norbornen-2-yl 2-chloro-ethane phosphonate, hydroxypropoxypropyl 1,4,5,6,7,7-hexachloro-5-norbornen-2yl 2-bomoethane phosphonate, hydroxypropoxypropyl 1,4,5,6,7,7-hexabromo-5-norbornen-2-yl 2-chloroethane phosphonate, and hydroxy-ethoxyethyl 1,4,5,6,7,7-hexabromo-5-norbornen-2-yl 2-bomoethane phosphonate.

When bis(2-chlrethyl) vinyl phosphite (or the corresponding bis(2-bromoethyl) vinyl phosphite) is heated mole for mole with hexachlorocyclopentadiene (or the bromo analogue) above 100°C., e.g. to 150°C.

there is formed the corresponding phosphonate: bis(2-chloroethyl) 1,4,5,6,7,7-hexachloro-5-norbornene-2-phosphonate (or bromine analogues). Upon heating with 1 mole of a diole such as diprophylene glycol or diethylene glycol there is obtained 2-chloroethyl hydroxypropoxypropyl 1,4,5,6,7,7-hexachloro-5-norbornene-2-phosphonate, 2-chlorethyl hydroxyethoxyethyl 1,4,5,6,7,7-hexachloro-5-norbornene-2-phosphonate, 2-bromoethyl hydroxy-propoxypropyl 1,4,5,6,7,7-hexabromo-5-norbornene-2-phosphonate.

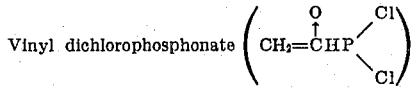

Vinyl dichlorophosphonate heated mole for mole with hexachlorocyclopentadiene (or hexabromocyclopentadiene) forms 1,4,5,6,7,7-hexachloro-5-norbornen-2-yl dichlorophosphonate (or 1,4,5,6,7,7-hexabromo-5-norbornen-2-yl dichlorophosphonate). One mole of either of these compounds with 2 moles of an alcohol or phenol ROH, e.g., methyl alcohol, butyl alcohol, decyl alcohol, phenol, chlorophenol or the like gives the compound

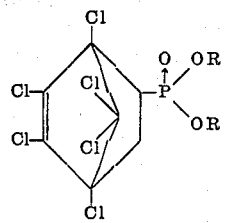

(or the bromine analogue). Heating one mole of this compound with one mole of a diol such as diethylene glycol or dipropylene glycol and distilling off the monohydric alcohol or phenol gives products including methyl hydroxypropoxypropyl 1,4,5,6,7,7-hexachloro-5-norbornene-2-phosphonate, decyl hydroxyethoxyethyl 1,4,5,6,7,7-hexachloro-5-norbornene-2-phosphonate, phenyl hydroxypropoxypropyl 1,4,5,6,7,-7-hexachloro-5-norbornene-2-phosphonate, octyl hydroxyethoxyethyl 1,4,5,6,7,7-hexabromo-5-norbornene-2-phosphonate or the like. In this reaction preferably there are at least 4 atoms in the chain between the two hydroxyl groups of the diol reactant to avoid ring formations. Reacting one mole of 1,4,5,6,7,-7-hexachloro-5-norbornen-2-yl dichlorophosphonate with a mixture of 1 mole of an alcohol (or phenol) R₁OH and one mole of a diol, HOR₂OH, e.g. dipropylene glycol or diethylene glycol forms the same product directly but with impurities since in addition to forming the desired compound

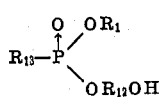

There are also formed

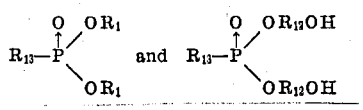

where R13 is the 1,4,5,6,7,7-hexachloro-5-norbornen-2-yl group, R₁ is alkyl or aryl and R₁₂ alkylene of at least two carbon atoms (and preferably at least 4 carbon atoms), alkyleneoxyalkylene, or poly(alkyleneoxy) alkylene.

The same compounds can be prepared by the Arbuzov reaction of 1,4,5,6,7,7-hexachloro-2-bromo-5-norbornene with a phosphite having the formula (RO)₂POR₁ where R is aryl and R₁ is hydroxyalkyl or hydroxyalkoxyalkyl or hydroxy(polyalkoxy)alkyl and removing one mole of RBr, e.g. by distillation. In addition to the compounds mentioned above by this procedure there can be obtained, for example, ethyl hydroxyethyl 1,4,5,6,7,7-hexachloro-5-norbornene-2 -phosphonate. These same compounds also can be prepared by reacting hexachlorocyclopentadiene (or Hexabromocyclopentadiene) with a compound

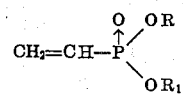

where R is alkyl or aryl and R₁ is hydroxylkyl, e.g. hydroxyethyl or hydroxypropyl or hydroxyalkoxyalkyl, e.g. hydroxyethoxyethyl or hydroxypropoxypropyl.

Likewise the compounds can be prepared by reacting 1,4,5,6,7,7-hexachloro-5-norbornen-2ol (or the corresponding hexabromo or hexafluoro analogues) with a tertiary phosphite of the formula

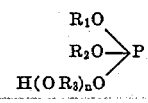

where R₁ and R₂ are lower alkyl, lower alkenyl, lower haloalkyl, or lower haloalkenyl, e.g., methyl, ethyl, butyl, 2-chloroethyl, 3-bromopropyl, 2-fluoroethyl, allyl, 2-bromoallyl and RR₃ is lower alkylene of at least 2 carbon atoms, e.g. ethylene, propylene, butylene and n is an integer of 1, 2, 3, 4, e.g. hydroxybutyl, hydroxyethoxyethyl, hydroxypropoxypropyl esters. The resulting hexahalonorbornenyl alkyl hydroxyalkyl phosphites are rearranged by heating over 150°C to the corresponding phosphonates.

EXAMPLE 37

The compound 1,4,5,6,7,7-hexachloro-5-norbornen-2-ol is prepared as follows:

Hexachlorocyclopentadiene was reacted with vinyl acetate by the Diels-Alder procedure to give 1,4,5,6,7,-7-hexachloro-5-norbornen-2-yl acetate. This is hydrolyzed by sodium hydroxide or hydrochloric acid to the alcohol. In a specific example, 3 moles of hexachlorocyclopentadiene were placed in a flask together with 2.2 grams of 2,6-di-t-butyl-4-methylphenol (a polymerization inhibitor) and there were added dropwise 3 moles of vinyl acetate while the mixture was maintained in a nitrogen atmosphere at a temperature of about 140°-160°C. The addition took 4.5 hours and reaction was continued for another 1.5 hours at about 160°C. The product was vacuum distilled. The cut boiling at 106°-113°C. at 0.59-.80 mm. was collected. It was a clear pale yellow liquid with clear colorless crystals. It analyzed correctly for 1,4,5,6,7,7-hexachloro-5-norbornen-2-yl acetate. 47.8 grams of this acetate was dissolved in 20 ml. of methanol and 5.3 grams of sodium hydroxide dissolved in 200 ml. of methanol was gradually added. The purple colored liquid formed was filtered to remove a white solid precipitate. The filtrate was concentrated on a flash evaporator to remove most of the methanol. The product was diluted with 80 ml. of methanol, the solid filtered off and the filtrate concentrated at the water pump to give a brown black oil. The oil was vacuum distilled. The distillate (5.5 grams) at 68°–127°C. at 1.5–1.7 mm. was collected and redistilled and the cut boiling at 93°C. at 0.07 mm. collected. It was a dark red-brown viscous liquid and analyzed C 27.69%, H 1.42%, Cl 65.78%. Itwas 1,4,5,6,7,-7-hexachloro-5-norbornen-2-ol.

This same compound was obtained in purer form by hydrolysis with HCl in refluxing methanol for 40 hours. The compound was recovered after removing volatiles at the water pump as a crystalline solid, M.P. 156°–158°C. by recrystallization from acetone, C 26.59%, H 1.17%, Cl 66.36%.

EXAMPLE 38

200 grams (0.632 mole) of 1,4,5,6,7,7-hexachloro-2-hydroxy-5-norbrnene (M.P. 157°–159°C.) were mixed with 170 grams (0.632 mole) of tris (2-chloroethyl) phosphite and heated in a nitrogen atmosphere at 103°–150°C. residue temeprature for 6 hours at 31 to 42 mm. and 48°–64°C. vapor temperature to obtain 21.1 grams of 2 -chloroethanol as the distillate. The residue was a slightly viscous, dark orange brown liquid weighing 329.3 grams. It had an iodine number of 26.08 (theory 50.2), C 26.55%, H 2.51%, Cl 53.05%, P 6.04%. It was bis(2-chloroethyl) 1,4,5,6,7,7-hexachloro-5-norbornen-2-yl phosphite (also called HNB-CEP). The product also had considerable phosphonate caused by rearrangement at the high refluxing temperature as shown by the relatively low iodine number. Reaction of the product mole for mole with diethylene glycol or dipropylene glycol and removal of one mole of 2-chloroethanol gives the corresponding 2-chloroethyl hydroxyethoxyethyl (or hydroxypropoxypropyl) 1,4,5,6,7,7-hexachloro-5-norbornen-2-yl phosphite.

EXAMPLE 39

272 grams (1mole) of hexachlorocyclopentadiene were preheated to 160°C. in a nitrogen atmosphere. Then there was added 233 grams (1 mole) of bis(2-chloroethyl) vinyl phosphonate dropwise in a period of 1 hour. The heating was continued after completion of the addition for 4 more hours at 160°C. The reaction solution was a dark reddish orange solution. The solution was distilled under vacuum up to a 115°C. residue temperature, distillate temperature 76°–77°C. to 0.05 mm. to remove 48.0 grams of hexachlorocyclopentadiene. Heating was continued at up to 114°C. residue temperature at 73°–89°C. vapor temperature at 0.09 to 0.03 mm. and there was recovered an additional 2.3 grams of hexachlorocyclopentadiene but no bis(2-chloroethyl) vinyl phosphonate. The residue of 448 grams was bis(2-chloroethyl) 1,4,5,6,7,7Hexachloro-5-norbornen-2-yl phosphonate (HNB-CET), iodine number 1.70, C 26.67%, H 2,63%, CL 52.45-, P 6.82%. This product which is an isomer of the product of Example 38 can be reacted in the same manner with an equimolar amount of a diol to form a monohydric alcohol useful in making fireproof and fire retardant polyurethane foams.

EXAMPLE 40

252.9 grams (0.5 mole) of the HNB-CEP formed in Example 38 were mixed with 67.1 grams (0.5 mole) of dipropylene glycol and heated under a nitrogen atmosphere at the water pump to distill out 2-chloroethanol. Distillation was carried out for 1.5 hours at 104°–138°C. residue temperature and 65°–76°C. vapor temperature at 41–33 mm. There were collected 34.5 grams of distillate. The residue was clear, viscous dark orange-brown liquid weighing 280.7 grams. The iodine number was 16.47 (theory 45.35 for the phosphite product) showing that the product was about 36% 2-chloroethyl hydroxypropoxypropyl 1,4,5,6,7,7-hexachloro-5-norbornen-2yl phosphite (DPG-HNB-CEP) and 64percent hydroxypropoxypropyl 1,4,5,6,7,-7hexachloro-5-norbornen-2-yl -chloroethane phosphonate. The product analyzed C 31.52%, H 3.73%, Cl 43.55%, P 5.31%

EXAMPLE 41

65.0 grams (0.1286 mole) of HNB-CEP and 13.6 grams (0.1286 mole) of diethylene glycol were heated up to 120°C. residue temperature and 62°–90°C. vapor temperature at 52–48 mm. to distill off 6.6 grams of 2-chloroethanol in 1.5 hours. The residue was a slightly viscous liquid weighing 65.5 grams. It had an iodine number of 19.05 (theory 47.8) and analyzed C 29.88%, H 3.27%, Cl 44.66% , P 5.32%. It was a mixture of about 40% 2-chloroethyl hydroxyethoxyethyl 1,4,5,6,-7,7-hexachloro-5-norbornen-2-yl phosphite and 60% hydroxyethoxyethyl 1,4,5,6,7,7-hexachloro-5-norbornen-2-yl 2-chlorethane phosphonate.

Example 42

392.6 grams (1.456 moles) of tris(2-chloroethyl) phosphite and 482.0 grams (1.456 moles) of 1,4,5,6,7,-7-hexachloro-2-methylol-5-norbornene were heated under nitrogen at 18.50 mm. up to 125°C. residue temperature while distilling off liquid including 2-chloroethanol at 60°C. and 48 mm., 83°C. at 35 mm. and 100°C. at 18 mm. Total distillate was 77.5 grams. Distillation was continued for 7 hours up to 142°C. residue temperature to obtain 36.2 grams more of distillate. The residue was a nearly colorless, slightly orange, slightly viscous liquid in an amount of 741.1 grams. It had an iodine number of 36.41 (Theory 48.8), C 27.54%, H 2.40%, Cl 52.63%, P 5.35% and was bis(2-chloroethyl) 1,4,5,6,7,7-hexachloro-5-norbornen-2-ylmethyl phosphite with a small amount of 2-chloroethyl 1,4,5,6,7,7-hexachloro-5-norbornen-2-ylmethyl 2-chloroethane phosphonate.

EXAMPLE 43

360.0 grams (0.6925 mole) of bis (2-chloroethyl) 1,-4,5,6,7,7-hexachloro-5-norbornen-2-ylmethyl phosphite (prepared in Example 42) was mixed with 93.6 grams (0.6925 mole) of dipropylene glycol under a nitrogen atmosphere and heated under water pump vacuum up to 145°C. while distilling off the 2-chloroethanol formed. 56.6 grams of distillate were collected. The residue was a slightly viscous, clear orange liquid weighing 396.4 grams. It had an acid number of 3.92 (theory zero) and iodine number of 29,71

(theory 44.25) and was approximately 67% 2-chloroethyl hydroxypropoxypropyl 1,4,5,6,7,7-hexachloro-5-norbornen-2-ylmethyl phosphite and 33% hydroxypropoxypropyl 1,4,5,6,7,7-hexachloro-5-norbornen-2-ylmethyl 2-chloroethane phosphonate. The analysis was C 33.33%, H 3.46%, Cl 43.73%, P 5.57%.

EXAMPLE 44

The product of Example 43 was heated under nitrogen for 10.5 hours at 155°C. The resulting material was a nearly clear, viscous organic liquid. The iodine number was 10.55 indicating that the product was approximately 75% hydroxypropoxypropyl 1,4,5,6,7,7-hexachloro-5-norbornen-2-ylmethyl 2-chloroethane phsophonate and 25 percent the starting phosphite. The analysis was C 32.64%, H 3.75%, Cl 43.32%, P 5.75%.

Hexachlorocylopentadiene and piperylene from the Diels-Alder adduct (PNB)

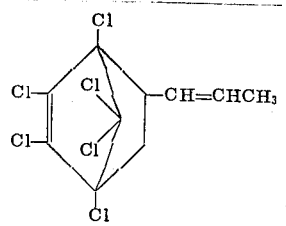

(5-(1'-propenyl-)1,2,3,4,7,7-hexachloro-2-norbornene) (and a small amount of its isomer). This is then reacted mole for mole with bromine or chlorine to form

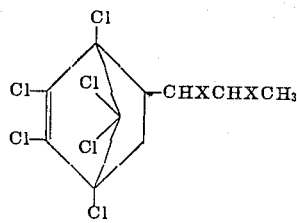

where X is chlorine or bromine.

EXAMPLE 45

In a specific example to 170.5 grams (0.5 mole) of the Diels-Alder adduct of hexachlorocyclopentadiene and piperlene ( a plae yellow liquid) there was added 0.5 mole (plus 0.9 gram excess) of bromine in 330 ml. of carbon tetrachloride with cooling and stirring over 5 hours. The temperature was kept at 19°–35°C. The solvent was distilled off to recover the dibromo compound as a high-boiling, golden yellow liquid, 5-(1',2'-dibromopropyl) 1,2,3,4,7,7-hexachloro-2-norbornene.

This product when heated mole for mole with dialkyl hydroxylakyl phosphites or dialkyl hydroxyalkoxyalkyl phosphites forms isomeric mixtures of monohydroxy phosphonate, e.g. with diethyl hydroxypropoxypropyl phosphite there is obtained.

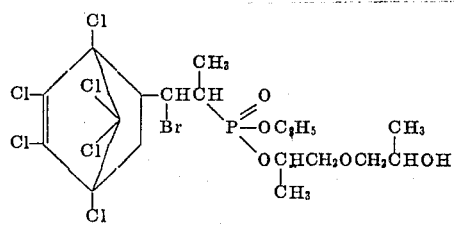

and its positional isomer with the bromine atom on the carbon atom adjacent to the phosphorus atom.

EXAMPLE 46

PNB (5-(1'-propenyl-) 1,2,3,4,5,6,7,7-hexachloro-2-norbornene) in an amount of 340.9 grams (1.0 mole) was placed in a flask together with 400 ml. $CCL_4$ (solvent) at room temperature. There was added 75.9 grams (1.07 mole) of chlorine ($Cl_2$) at 26 to 55°C. gradually over 5.5 hours. The solvent was recovered by flash distillation and distillation at the water pump. The residue was subject to vacuum distillation. The cut having a B.P. 127°–132°C. at 0.19 mm. in a yield of 149.6g. analyzed C 20.06%, H 2.03%, Cl 68.05% and was 5-(1'2' -dichloropropyl) 1,2,3,4,7,7-hexachloro-2-norbornene (PONB). The cut immediately preceding this, B.P. 120° (0.3 mm.) to 133°C. (0.22 mm.), 149.6 g., was the same product with a trace of starting PNB. Two other cuts which included the PONB together with minor amounts of impurities weighed 60.5 grams.

Tris (haloalkyl) phosphites, e.g. tris(2-chloroethyl) phosphite, tris(2-bromoethyl) phosphite, tris (2-bromopropyl) phosphite, tris(2-fluoroethyl) phosphite, tris(2,3-dichloropropyl)phosphite, tris(2-chloropropyl) phosphite when heated, e.g. to 150°C. with dihalopropionitriles, e.g., alpha, beta-dichloropropionitrile, alpha, beta-dibromopropionitrile and alpha, beta-difluoropropionitrile formed phosphonates in the following fashion

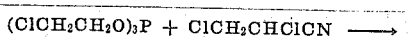
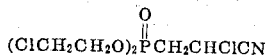

(together with its isomer

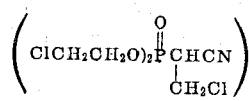

These phosphonates in turn are heated with an equimolar amount of a diol $HO(R'O)_nH$ to form phosphonates such as

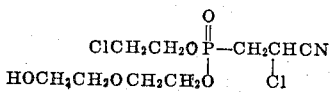

e.g. 2'-chloroethyl hydroxyethoxyethyl 2-chloro- 2-cyanoethane phosphonate, 2'-chloroethyl hydroxyethoxy-ethyl 2-chloro-1-cyanoethane phosphonate, 2'-bromoethyl hydroxypropoxypropyl 2-chloro-2-cyanoethane phosphonate, 2'-fluoroethyl hydroxybutyl 2-bromo-2-cyanoethane phosphonate, 3'-chloropropyl hydroxypropoxypropyl 2-chloro-1-cyanoethane phosponate.

EXAMPLE 47

Bis(2-chlorethyl) chlorocyanoethane phosphonate.

317.7 grams (2.663 moles) of alpha, beta-dichloropropionitrile were mixed with 177.1 grams of 2chlorethanol (solvent) and 898.9 grams of bis(2-ethoxyethyl) ether (solvent). The mixture was heated to 130°C. under nitrogen until slow distillation of the 2-chloroethanol started and there was then added dropwise 691.5g. (2.563 moles) of tris(2-chlorethyl) phosphite over 2hours. The reaction mixture temperature was held at 130°–150°C. while the vapor temperature was about 90°–118°C. Heating was continued for another half hour at about 150°C. (reaction mixture) at which time a total of 230 ml. of distillate had collected. Distillation was then continued at the water pump until the bis(ethoxyethyl)ether was recovered. The residue was filtered and distillation was then resumed at about 0.4 to 1.6 mm. to recover unreacted tris(2-chloroethyl) phosphite. The residue was crude bis(2-chlorethyl) chlorocyanoethane phosphonate, a dark brown viscous oil weighing 528.6grams. A portion (63.2 grams) of this was subjected to distillation in a micro apparatus. The residue from the distillation was a dark reddish brown viscous liquid. Treating with 700 ml. of acetone gave 53.1 grams of a solid dark brown mass. Recrystallization from acetone gave the product as light yellow brown, fine cyrstals. The following compound

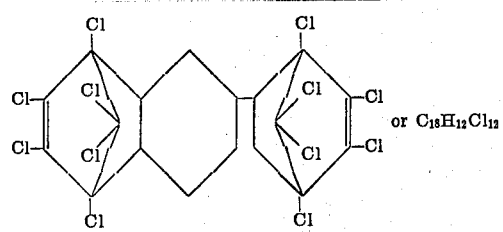

or $C_{18}H_{12}Cl_{12}$ called CNB is made by condensing 2 moles of hexachlorocyclopentadiene with 1 mole of 4-vinylcyclohexene. It reacts with two moles of chlorine (even if excess chlorine is used) to give dichloro CNB shown below and two moles of gaseous HCL

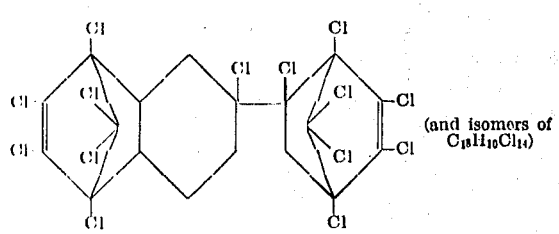

(and isomers of $C_{18}H_{10}Cl_{14}$)

The corresponding tetradecabromo compounds can also be prepared by adding bromine to the bromo analogue of CNB. The product reacts with dialkyl hydroxyalkyl phosphites or dialkyl hydroxyalkoxyalkyl phosphites or the corresponding di(haloalkyl) or di(haloalkoxyalkyl) or di(haloalkoxyalkyl) hydroxyalkoxyalkyl phosphites to form the corresponding phosphonates in the Arbuzov reaction by heating to about 140°C. Thus there can be prepared chloroethyl hydroxyethoxyethyl dichloro CNB phosphonate, bromoethyl hydroxypropoxypropyl dichloro CNB phosphonate, fluoroethyl hydroxyethyl dichloro CNB phosphonate.

The 1:1 adduct of 4-vinylcyclohexene and hexachlorocyclopentadiene (1,4,5,6,7,7-hexachloro-2-(3'-cyclohexenyl)-5-norbornene) (also called HCNB) as well as CNB itself (and their bromo and fluoro analogues) react with tertiary phosphites $(R_5O)_3P$ where $R_5$ is as defined above to form phosphonates such as dimethyl CNB phosphonate, diethyl CNB phosphonate, di(2-chloroethyl) CNB phosphonate, di(2-bromoethyl) CNB phosphonate, di(beta-chloroethyl) 1,4,5,6,7-pentachloro-2-(3'-cyclohexenyl)-5-norbornene-7-phosphonate. These products in turn can be transesterified with one mole of a diol $HO(R'O)_nH$ where $R'$ and $n$ are as previously defined to give products such as ethyl hydroxypropoxypropyl CNB phosphonate, 2-chloroethyl hydroxyethoxyehtyl CNB phosphonate, 2-bromoethyl 4-hydroxybutyl CNB phosphonate, 2-chloroethyl hydroxydiethyoxyethyl bromo CNB phosphonate, 2-fluoroethyl hydroxypropoxypropyl fluoro CNB phosphonate, 2-chloroethyl hydroxyethoxyethyl 1,5,6,7,7-pentachloro-2-(3'-cyclohexenyl)-5-norbornene-7-phosphonate. Some representative equations with HCNB are as follows:

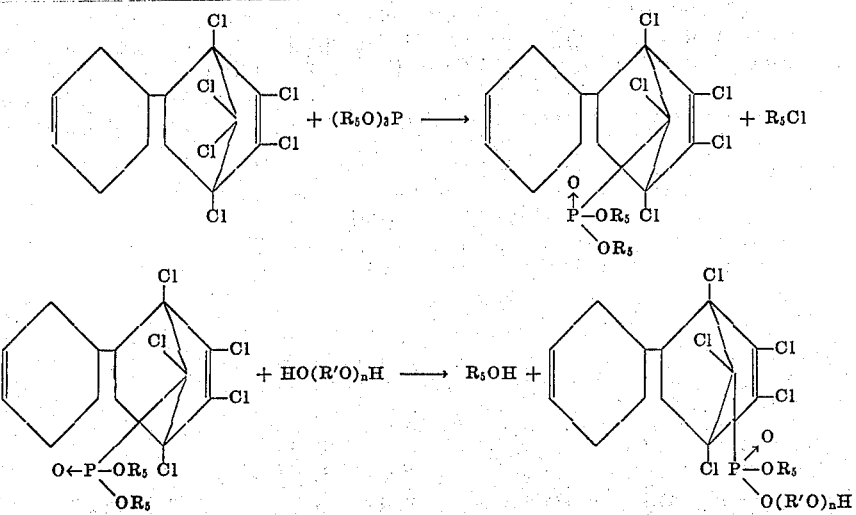

For CNB the product is

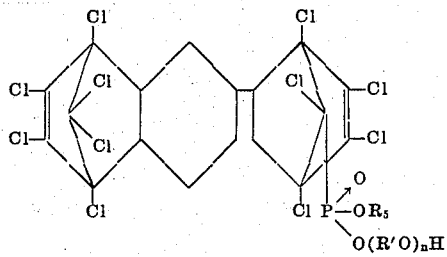

Of course, the products are formed as a mixture of isomers. Thus in the CNB product the phosphorus atom can be attached in the other chlorinated norbornene ring. The various stereo isomers also are formed simultaneously.

Similar products can be produced by reacting one mole of 4-vinylcyclohexane with 2 moles of pentachlorocyclopentadiene phosphonate of the formula

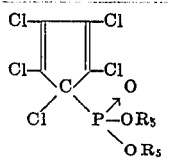

where $R_5$ is as defined above to give a product

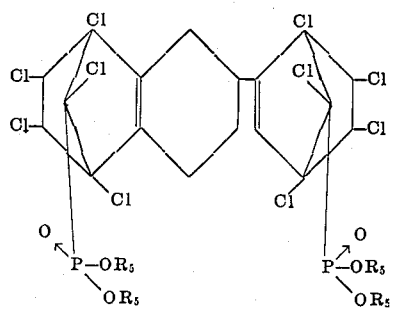

When one mole of this product is heated with one mole of diol there is formed a monohydric alcohol of the present invention. In the formulae the chlorine atoms can be replaced by fluorine or bromine.

Likewise the addition product of 1 mole of chlorine (or bromine) with HCNB (or its bromo or fluoro analogues) and having the formula

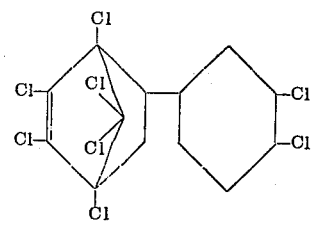

(called HDNB) reacts in the Arbuzov reaction with tertiary phosphites of the formula

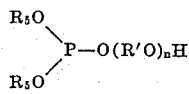

to form hydroxyphosphonates including 2-chloroethyl hydroxyethoxyethyl 1,2,3,4,7,7-hexachloro-5-(1'-chlorocyclohex-4'-yl) 2-norbornene 2'-phosphonate (2-chloroethyl hydroxyethoxyethyl HDNB phosphonate), 2-chloroethyl hydroxypropoxypropyl 1,2,3,4,7,7-hexachloro-5-(1'-bromocyclohex-4'-yl) 2-norbornene 2'-phosphonate, ethyl hydroxy-dipropoxypropyl 1,2,3,4,7,7-hexabromo HDNB phosphonate, 2-bromoethyl hydroxypropoxypropyl HDNB phosphonate.

Example 47(a)

CNB

3.5 moles (378.6 grams) of 4-vinyl-1-cyclohexene and 2 grams of 2,6-di-t-butyl-4-methylphenol (an antioxidant) were mixed at room temperature and heated to 128°C. in a nitrogen atmosphere. To this solution was added dropwise 1909.6 grams (7.0 moles) of hexachlorocyclopentadiene while the temperature rose, first from external heating and then due to the exothermic action, from about 128°C. to 148°C. The addition was completed in 5 hours and 45 minutes at this temperature. The orange colored liquid was heated, for a further 14 hours at about 145°C. The reaction product was poured hot and after some cooling mixed with 80 grams of petroleum ether (B.P. 30°-60°C.) and with 785 grams of isopropyl alcohol, whereupon the principal product of reaction, the 2:1 molar adduct of $C_5Cl_6$ to 4-VCH designated CNB (or $C_{18} H_{12} Cl_{12}$) precipitated as a white crystalline solid and was isolated by filtration. After washing with 400 grams of isopropyl alcohol and drying in a vacuum oven at 25°C./0.5 mm. over Drierite for 2 days a first crop of CNB of 1159.0 grams was obtained, M.P. 203°-212°C. The total yield obtained including an additional crop isolated by concentration of the filtrate and dilution with isopropyl alcohol was 2194.9 grams which after one crystallization had a M.P. 212°-231°C. Recrystallization from n-heptane (or from acetone) using some activated carbon to absorb traces of impurities gave analytically pure CNB white crystals M.P. 238°-243°C. to a colorless liquid without decomposition. CNB has the chemical name 6-(1', 2', 3', 4', 7', 7' - Hexachloro-2'-norbornen-5'-yl-) 1,2,3,4,9, 9-hexachloro-1,4,4a,5,6,7,8,8a-octahydro-1,4-endomethylenenaphthalene.

In a similar fashion there is prepared the 1:2 adduct of d,l-limonen (dipentene) with hexachlorocyclopentadiene according to the equation

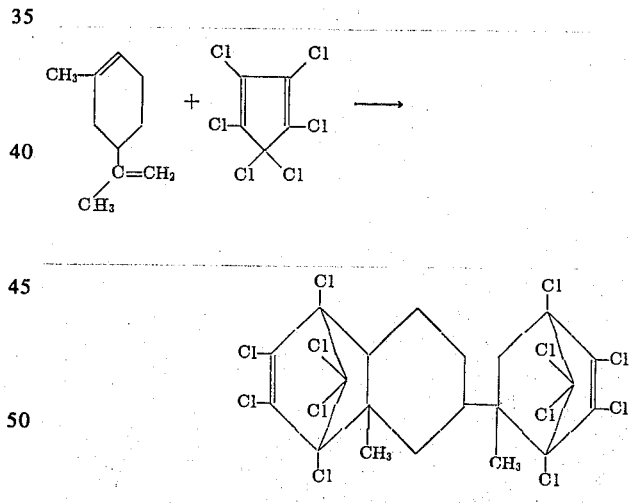

The adduct occurs as a mixture of stereoisomers. The 1:1 adduct of dipentene and hexachlorocyclopentadiene was also prepared. Both of these adducts were useful in making phosphites and phosphonates analogous to those obtained from CNB.

The 1:1 adduct of vinyl cyclohexene and hexachlorocyclopentadiene (HCNB) is obtained as a minor by-product (about 3 percent) as a forerun in the distillation to recover CNB. It can be obtained in higher yields by carrying out the same reaction but starting with either a 1:1 mole ratio or a 2:1 mole ratio of vinyl cyclohexene and hexachlorocyclopentadiene. It was a pale yellow liquid distilling at 132°C./0.14 mm. to 144.5°C./0.2 mm.

Example 47(b)

There were employed 173.1 grams (1.6 moles) of hexachlorocyclopentadiene, 873.0 grams (3.2 moles) of 4-vinyl cyclohexene and 20.9 grams (2.0% by weight of total reactants) of tris (2-chloroethyl) phosphite. The total amount of 4-vinylcyclohexene was heated under a nitrogen atmosphere with stirring and reflux to a predissolved mixture of one-half of the hexachlorocyclopentadiene and one-half of the tris (2-chloroethyl) phosphite were added dropwise at 120°–160°C. in about 2 hours. The mixture was then heated 1 hour at 170°C., cooled at 160°C. in about 10 minutes and the remaining half of the hexachlorocyclopentadiene and tris(2-chloroethyl) phosphite added over about 3 hours. Heating was continued at 160°C. for an additional 6 hours. The mixture was cooled to about 110°C. and poured into 1.0 liter of isopropanol. The crystals (544.0 grams) were CNB. The filtrate together with washings from the crystals was concentrated at about 45°C. to obtain a very viscous light brown oily liquid which was poured into a tray, transferring with petroleum ether and allowing the petroleum ether to evaporate. Then added 400 ml. of isopropanol to obtain 38.8 grams more of crystalline CNB. The oil remaining after filtering off the CNB was concentrated to give 466.9 grams which contained the Michaelis-Arbuzov type phosphonate reaction products of tris (chloroethyl) phosphite with (1) CNB and (2) HCNB.

EXAMPLE 47(c)

Example 47(b) was repeated replacing the 2 percent of tris (2-chloroethyl) phosphite by 2 percent of tris (dipropylene glycol) phosphite. After removal of the CNB crystals the residual oil weighed 466.9 grams and contained the Michaelis-Arbuzov type phosphonate reaction products of tris (dipropylene glycol) phosphite with (1) CNB and (2) HCNB.

In examples 47(b) and (c) there was no need to isolate the individual phosphonates prepared since in each one the mixture was effective in making self-extinguishing and fire retardant polyurethane foams.

EXAMPLE 48

Dichloro CNB 0.5 mole (326.85 grams) of CNB or $C_{18}H_{12}Cl_{12}$, a white crystalline solid, was dissolved in 1000 ml. of carbon tetrachloride and 6 moles (425.4 grams) of chlorine ($Cl_2$) were added in the presence of ultraviolet light at room temperature to reflux temperature for 4 hours and then at reflux temperature for 28.5 hours. The product was evaporated to remove carbon tetrachloride, chlorine and HCL. The slightly gummy, amber-colored solid obtained was dissolved in 1500 ml. of acetone and filtered through activated charcoal. The liquid was flash-evaporated to give a viscous liquid which precipitated in about 350 ml. of isopropanol. The off white elastic mass was dried to give 369.5 grams of product which was recrystallized from acetone by adding isopropanol. It melted at 97°–110°C. The analysis of the dichloro CNB product was C 29.78%, H 1.46%, Cl 69.04%, which agreed quite closely with theoretical for $C_{18}H_{10}Cl_{14}$.

EXAMPLE 49

Hexachloro (dichlorocyclohexyl) norbornene.

327.9 grams (0.861 mole) of HCNB, a pale yellow clear liquid, was placed into a flask with 1.2 liters of $CCl_4$ as a solvent. There was then bubbled in 62.9 grams (0.887 mole) of chlorine gas at room temperature over a period of 4 hours and 10 minutes. The temperature was kept below 40°C. The solution was flash-evaporated to 400 ml. The volatiles were then removed at the water pump. The product was primarily hexachloro(dichlorocyclohexyl)norbornene (HDNB) mixed with some starting hexachloro(cyclohexenyl)norbornene (HCNB) and a small amount of dimerized starting material.

One mole of 1,2,3,4,5-pentachloro-1-(beta-chloroethyl) 2,4-cyclopentadiene reacts with one mole of 4-vinylcholorhexene to form

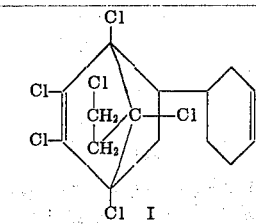

(also called 1,4,5,6,7-pentachloro-7-beta-chloro-ethyl-2-(3'-cyclohexenyl)-5-norbornene)

When two moles of the chlorinated cyclopentadiene compound are reacted with one mole of 4-vinylcholohexene, the product is

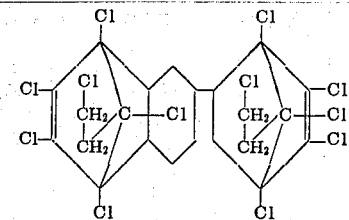

II

Analogous products having halogen substituted aliphatic rings are formed by reacting 1,2,3,4,5-pentabromo-1-(betachloroethyl) cyclopentadiene with one or two moles of 4-vinylclohexene. Compounds I and II and their analogues mentioned above react with tertiary phosphites, of the formula $(R''O)_3P$, e.g. at 140°C., in the Arbuzov reaction to form phosphonates of the formula

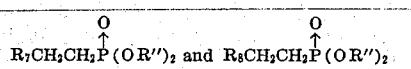

by the reactions

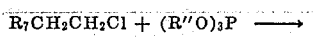

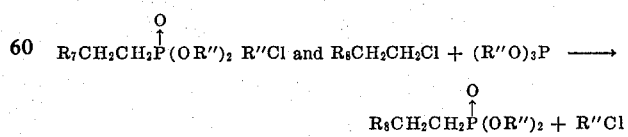

where $R_7CH_2CH_2Cl$ is compound I and $R_8CH_2CH_2Cl$ is compound II and R'' is alkyl, alkenyl, haloalkyl or haloalkenyl, e.g. methyl, ethyl, butyl, allyl, methallyl, chloroethyl, chloropropyl, fluoroethyl, bromoethyl, 2- chloroallyl. All of the R'' groups can be the same or different. The phosphonate esters thus prepared can be transeseterified with diols, e.g. 1,4-butanediol, diethylene glycol, dipropylene glycol, triethylene glycol or tripropylene glycol by simply heating the phosphonate and diol in equimolar amounts and distilling off the monohydric alcohol formed, e.g.

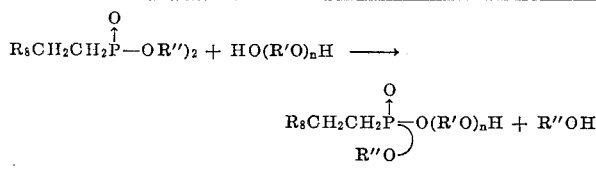

where R' is lower alkylene of at least two carbon atoms and n is an integer, e.g. 1,2,3,4. Preferably at least 4 atoms separate the hydroxyl groups in the diol. Examples of monohydric compounds within the invention are methyl hydroxypropoxypropyl 1,4,5,6,7-pentachloro-2-(3'-cyclohexenyl)-5-norbornenly-7-ethane phosphonate, 2-chloroethyl hydroxyethoxyethyl 1,4,5,6,7-pentabromo-2-(3'-cyclohexenyl)-5-norbornenyl-7-ethane phosphonate, 2-bromoethyl 4-hydroxybutyl 1,4,5,6,7-pentafluoro-2-(3'-cyclohexenyl)-5-norbornenyl-7-phosphonate

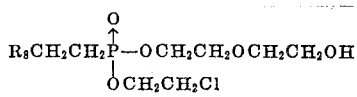

and the corresponding compounds where the chlorine atoms in $R_8$ are all replaced by either bromine or fluorine, as well as the corresponding compounds

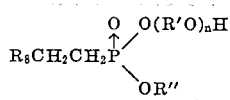

where the transesterifying diol is dipropylene glycol or triethylene glycol and R'' is methyl, fluoroethyl, 3-chloropropyl, ethyl, or butyl.

EXAMPLE 49(a)

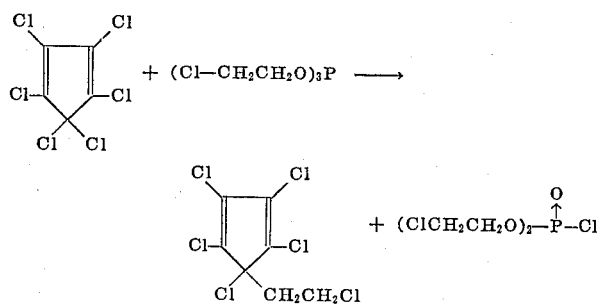

One mole (269.5 grams) of tris (2-chloroethyl) phosphite was added dropwise to the solution of one mole (272.8 grams) of hexachlorocyclopentadiene in one liter of commercial grade xylene. Initially, the phosphite was at 25°C. and the xylene solution at 55°C. During the addition which took about 1 hour the color of the mixture changed gradually from pale yellow to golden yellow and then to black. After the addition of 55°C., the mixture was heated to 70°C. whereupon an exotherm resulted and the temperature reached 105°C. The mixture was cooled externally and then reheated to 70°C. It was kept at this temperature for a total of 6.5 hours. Then the products were separated by fractional distillation.

The first fraction was xylene which was recovered quantitatively. The second, small fraction was a mixture of recovered hexachlorocyclopentadiene and 1-(beta-chloroethyl)-1,2,3,4,5-pentachlorocyclopentadiene-2,4, which latter compound was designated CEPC. This fraction boiled at 88°C./2.0 mm. to 106°C./2.3 mm. The yield was 71.9 grams of a pale yellow liquid.

The third and most important fraction contained both CEPC and bis(2-chloroethyl) phosphorochloridate designated BCEP. This fraction was a pale yellow liquid distilling at 108°C./2.2 mm. to 135°C./3.4 mm. The crude yield was 245.6 grams. (Theoretical yield of CEPC 300.85 grams or 1 mole.)

The fourth fraction was 32.5 grams of an orange colored liquid, B.P. 138°C./3 mm. to 163°C./4 mm. and contained mostly BCEP. The fifth fraction was a brown black viscous, pourable, undistillable residue, 180 grams.

The third fraction which contained the major amount of the desired product CEPC was redistilled fractionally. Before the fractionation the weight was 245.6 grams and all products weighed 243.45 grams (including 0.95 gram of an undistillable residue), so the volatilization losses in the refractionation were only 2.15 grams.

This second fractional distillation yielded four distilled fractions and the residue. The major fractions were the second fraction (189.6 grams) and the third fraction (32.9 grams) both of which were pale yellow liquids. The second fraction was essentially CEPC with a small amount of BCEP. It distilled at 96°–102°C./0.38 mm. and analyzed C.25.82%, H 1.61%; Cl 67.49%, molecular weight 285 (in chloroform solution). Theory for $C_7H_4Cl_6$ are C 27.95%, H 1.34%, Cl 70.71%, molecular weight 300.85.

The third fraction was a mixture of CEPC and BCEP.

EXAMPLE 50

158.4 grams (0.527 mole) of 1-(beta-chloroethyl)-1,2,3,4,5-pentachlorocyclopentadiene, a pale yellow liquid, were mixed with 28.2 grams (0.26 mole) of 4-vinyl-1-cyclohexene at room temperature and heated to 130°C. and kept at 130°–154°C. for 9 hours. The temperature was then raised to about 160°C. and held there for an additional 5 hours and 20 minutes. The product was then vacuum distilled. The forecut was discarded. The fraction having a B.P. of 174°C./0.81 mm. to 198°C./4.1 mm. was the 1:1 adduct (compound I, $C_{15}H_{16}Cl_6$) a clear yellow liquid analyzing C 42.72%, H 4.43%, Cl 52.58%, R.I. 1.555 at 26°C., density 1.1545 at 25.5°C. and in an amount of 47.7 grams.

After removing compound I by distillation a small amount of additional distillate was recovered (about 3 grams). The residue was very viscous and dark brown-black when poured at 100°C. into a beaker. It solidified to give 62.0 grams of solid. The solid was dissolved in 500 ml. of acetone and the insolubles filtered off. The clear dark brown filtrate was filtered over charcoal, 100 ml. n-heptane added and the solution concenrated on a flash evaporator to 90 ml. The clear brown viscous solution was dissolved twice in ethyl ether and precipitated in aqueous isopropanol to obtain a light tan colored solid. This first solid weighted 8.3 grams dry and had a M.P. of 73°–78°C. The filtrate was treated with water and NaCl to obtain a second crop of solid. The second solid had a M.P. of 62°–70°C. The first solid analyzed C 38.92%, H 3.09%, Cl 58.04% while the second solid analyzed C 37.86%, H 3.11%, Cl 59.03%. Both of these solids were the 2:1 adduct (compound II, $C_{22}H_{20}Cl_{12}$) of different degrees of purity, the second solid being in the purer condition.

Alpha-chloroacrylontrile was heated with hexachlorocyclopentadiene to form 1,2,4,5,6,7,7-heptachloro-2-cyano-5-norbornene of the formula

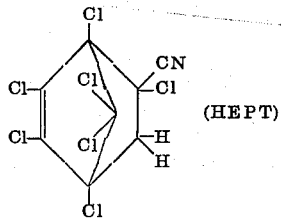

In a specific reaction there was used 818.4 grams of hexachlorocyclopentadiene, 262.6 grams of alpha-chloroacrylonitrile and 1.1 grams of hydroquinone (as a polymerization inhibitor). The reaction was carried out in a closed one liter steel reactor. The reaction vessel was heated over a period of 2 hours to 164°C. at which time heat was shut off as the exothermic reaction had begun. The pressure in the vessel rose to a maximum of 265 psi in another 10 minutes and then gradually subsided. After cooling and release of pressure, the product was heated on a water bath, filtered hot, the filtrate cooled to form a solid and the solid dissolved in 3 liters of heptane at 60°C. Undissolved matter was filtered off. The filtrate was concentrated by flash evaporation to give crude HEPT in a yield of 515.2 grams as tan-white solid crystals. These were recrystallized from heptane to give crystalline HEPT M.P. 174°–176°C.

This compound (and its bromine analogue 1,2,4,5,6,-7,7-heptabromo-2-cyano-5-norbornene as well as 1,4,-5,6,7,7-hexachloro-2-bromo-2-cyano-5-norbornene) are also useful for forming monohydroxyphosphites and phosphonates. Likewise there can be used

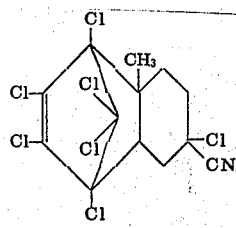

and its isomer

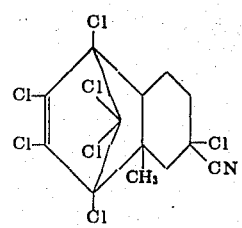

These two isomers are formed together as a yellow high boiling liquid by reacting one mole of hexachlorocyclopentadiene with one mole of a mixture of 2-methyl-5-chloro-5-cyano-1-cyclohexene and 1-methyl-5-chloro-5-cyano-1-cyclohexene (the mixed cyclohexenes being prepared from equimolar amounts of isoprene and alpha-chloroacrylonitrile). The isomeric mixture after the reaction with $C_5Cl_6$ is designated MHEPT.

One mole of HEPT was heated for 8 hours at 140°–180°C. with one mole of tris(2-chloroethyl) phosphite and the 1,2-dichloroethane formed distilled out to form in 98 percent yield bis(2-chloroethyl) HEPT phosponate a yellow liquid of the formula

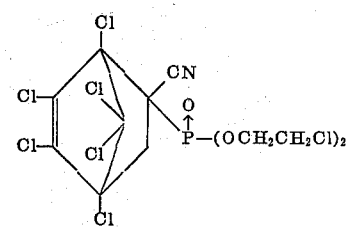

By using tris (2,3-dichloropropyl) phosphite there is obtained bis(2,3-dichloropropyl) HEPT phosponate, and similarly there are prepared bis(2-bromoethyl) HEPT phosphonate and bis(3-choropropyl) HEPT phosphonate. Preferably there is included an inert solvent, e.g. xylene.

The corresponding compounds are formed when MHEPT is used in place of HEPT, e.g. bis(2-chloroethyl) MHEPT phosphonate, bis(2,3-dichloropropyl) MHEPT phosphonate.

These phosphonate products from HEPT and MHEPT are then heated with an equimolar amount of a diol (preferably in the presence of a small amount, e.g. 0.01 mole of alkaline catalyst, e.g. sodium butylate), and the chlorohydrin formed removed by distillation. Thus, heating 1 mole of bis(2-chloroethyl) HEPT phosphonate with 1 mole of dipropylene glycol and removing the ethylene chlorohydrin by distillation gives 2-chloroethyl hydroxypropoxypropyl HEPT phosphonate of the formula

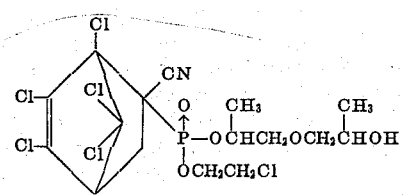

Similarly there are obtained 2-chloropropyl hydroxypropoxypropyl HEPT phosphonate, 2-chloroethyl hydroxyethoxyethyl HEPT phosphonate, 2-chloroethyl hydroxybutyl HEPT phosphonate, 2-bromoethyl hydroxyethoxyethyl HEPT phosphonate (as well as its analogue from bromo HEPT), 2-chloroethyl hydroxypropoxypropyl MHEPT phosphonate.

In place of using tris (2-chloroethyl) phosphite as the starting material there can be used other tertiary phosphites of the formula $(R_5O)_3P$ where $R_5$ is lower alkyl, lower haloalkyl, lower alkenyl or lower haloalkenyl. The $R_5$ groups can be the same or different e.g. trimethyl phosphite, triethyl phosphite, triisopropyl phosphite, tributyl phosphite, tris (2-bromoethyl) phosphite, tris(2-fluoroethyl) phosphite, triallyl phosphite, trimethyallyl phosphite, tris(2-chloroallyl) phosphite, methyl diethyl phosphite, bis(2-chloropropyl)2-chloroethyl phosphite.

Similar HEPT phosphonates can be formed by reacting hexachlorocylopentadiene with dialkyl 1-cyanovinyl phosphonates such as dimethyl 1-cyanovinyl phosphonate, diethyl 1-cyanovinyl phosphonate, and dibutyl 1-cyanovinyl phosphonate to form the corresponding dialkyl HEPT phosphonates. Reaction of these dialkyl HEPT phosphonates mole for mole with diols, e.g. diethylene glycol, dipropylene glycol, or 1,4-butanediol gives compounds such as ethyl hydroxyethoxyethyl HEPT phosphonate and methyl hydroxypropoxy propyl HEPT phosphonate. The equations are as follows:

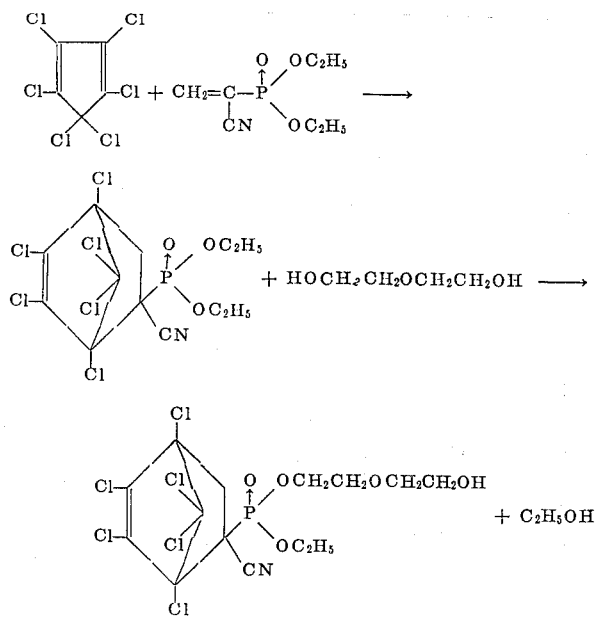

By utilizing hexabromocyclopentadiene and alpha-bromoacrylonitrile there is formed 1,2,4,5,6,7,7-heptabromo-2-cyano-5-norbornene (bromo HEPT) and by utilizing hexafluorocyclopentadiene and alpha fluoroacrylonitrile there is formed 1,2,4,5,6,7,7-heptafluoro-2-cyano-5-norbornene (fluoro HEPT). These compounds can be further reacted in the manner just described to form compounds such as ethyl hydroxyethoxy-ethyl bromo HEPT phosphonate, ethyl hydroxyethoxyethyl fluoro HEPT phosponate, 2-chloroethyl hydroxybutyl bromo HEPT phosphonate, 2-chloroethyl hydroxypropoxypropyl bromo HEPT phosphonate, 2-chloroethyl hydroxypropoxypropyl fluoro HEPT phosphonate, 3-bromopropyl hydroxyethoxyethyl fluoro HEPT phosphonate, 2-fluoroethyl hydropropoxypropyl bromo HEPT phosphonate, 2-fluoroethyl hydroxyethoxyethyl fluoro HEPT phosphonate, methyl hydroxypropoxypropyl bromo HEPT phosphonate, butyl hydroxyethoxypropyl fluoro HEPT phosponate, pentafluorophenyl hydroxyethoxyethyl fluoro HEPT phosphonate, trichlorophenyl hydroxypropoxypropyl bromo HEPT phosphonate.

Compounds analogous to 2-chloroethyl hydroxypropoxypropyl HEPT phosphonate are within the formula

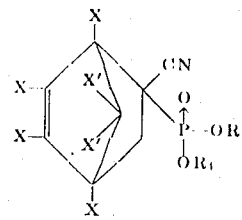

where X is Cl, Br or F (i.e. halogen of atomic weight up to 80), X' is Cl, Br, F, H, alkyl (e.g. methyl, ethyl, hexyl, hexadecyl, octadecyl, pentyl), alkoxy, haloalkyl, haloalkoxy, R is alkyl, alkenyl, haloalkyl or haloalkenyl, e.g. methyl, ethyl, butyl, decyl, pentyl, hexyl, hexadecyl, octadecyl, allyl, 2-chloroethyl, 2-bromoethyl, 2-fluoroethyl, 2-chloroallyl, $R_4$ is $H(OR')_n$ where $R'$ is lower alkylene of at least two carbon atoms, e.g. ethyl, propyl or butyl and $n$ is an integer, e.g. 1,2,3 or 4. Any alkyl or alkenyl roup is preferably lower alkyl or alkenyl, e.g. up to four carbon atoms. Thus $H(OR')_n$ can be $$-\underset{\underset{CH_3}{|}}{C}HCH_2OCH_2-\underset{\underset{CH_3}{|}}{C}HOH.$$

Compounds of this type include methyl 2-hydroxyethyl HEPT phosphonate, allyl hydroxypropoxypropyl HEPT phosphonate, ethyl hydroxyethoxyethyl HEPT phosphonate, 3-chloropropyl hydroxyethoxyethyl 1,4,-5,6,7,7-hexabromo-2-cyano-5-norbornene-2-phosphonate, 2-chloroethyl hydroxyethoxyethyl 1,4,5,-6, 7,7-hexafluoro-2-cyano-5-norbornene-2-phosphonate, ethyl hydroxybutyl 1,4,5,6-tetrachloro-2-cyano-5-norbornene -2-phosphonate, 2-chloroethyl hydroxydipropoxypropyl 1,4,5,6-tetrafluoro-2-cyano-5-norbornene-2-phosphonate, 2-chloroallyl hydroxypropoxypropyl 1,4,5,6,7,7-hexachloro-2-cyano-5-norbornene-2-phosphonate, 2-bromopropyl hydroxypropyl 1,4,5,6-tetrachloro-7-ethoxy-2-cyano-5-norbornene-2-phosphonate, 2-chloroethyl hydroxytriethoxyethyl 1,4,5,6-tetrabromo-7-ethyl-2-cyano-5-norbornene-2-phosphonate, allyl hydroxypropoxypropyl 1,4,5,6-tetrachloro-7,7-dimethyl-2-cyano-5-norbornene-2-phosphonate, 1,4,5,6,7-pentachloro-2-cyano-2-ethoxy-5-norbornene-7-phosphonate, 2-chloroethyl hydroxyethoxyethyl 1,4,5,6-tetrachloro-7,7-dimethoxy-2-cyano-5-norbornene-2-phosphonate, 2-chloroethyl hydroxyethoxyethyl 1,4,5,6,7-pentachloro-7-chloroethyl-2-cyano-5-norbornene-2-phosphonate.

The general reaction for preparing the starting materials is

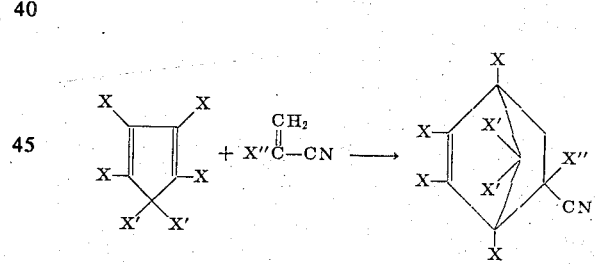

where X and X' are as defined above and X'' is X or hydrogen. Preferably X'' is halogen, i.e. Cl, Br or F. Typical starting substituted cyclodienes for the Diels-Alder reaction are hexachlorocyclopentadiene, hexabromocyclopentadiene, hexafluorocyclopentadiene, 5-,5-dimethoxytetrachlorocyclopentadiene, 5,5-dimethyltetrachlorocyclopentadiene, 1,2,3,4-tetrachlorocyclopentadiene, 1,2,3,4-tetrafluorocyclopentadiene. As nitriles there are preferably used alpha-chloroacylonitrile, alpha-bromoacrylonitrile or alpha-fluoroacrylonitrile

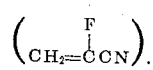

The phosphite reacted with the Diels-Alder product has the formula

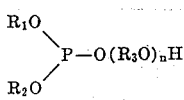

where $R_1$ and $R_2$ are alkyl, preferably lower alkyl, or chloro lower alkyl, bromo lower alkyl or fluoro lower alkyl and $R_3$ is lower alkylene of at least two carbon atoms, e.g. two to four carbon atoms, and n is an integer such as 1,2,3, or 4. One of $R_1$ and $R_2$ can be aryl or haloaryl, e.g. phenyl, chlorophenyl, pentafluorophenyl, dibromophenyl, tolyl.

In place of the tertiary phosphites there can be reacted alkali metal salts of secondary phosphites of the formula

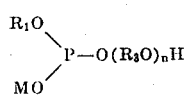

where M is sodium or potassium for example.

In place of the cyano containing starting materials such as HEPT there can be used other halogenated norbornenes of the formula

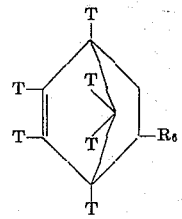

where $R_6$ is alkyl, e.g. methyl, ethyl, isopropyl, butyl, pentyl, hexyl, cyclohexyl, decyl, hexadecyl, octadecyl, halogen, e.g. chlorine, bromine or fluorine and T is halogen, e.g. chlorine, bromine or fluorine. (These compounds are prepared by the Diels-Alder reaction of hexahalocyclopentadiene with a compound having the formula $CH_2=CHR_6$.) They can then be reacted by heating with a tertiary phosphite having the formula $(R_5O)_3P$ where $R_5$ is as previously defined to give phosphonates having the formulae

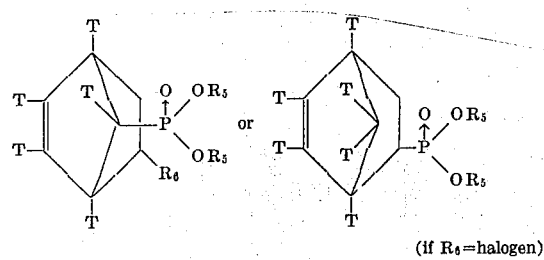

(if $R_6$=halogen)

which in turn are reacted with diols to give products of the formulae

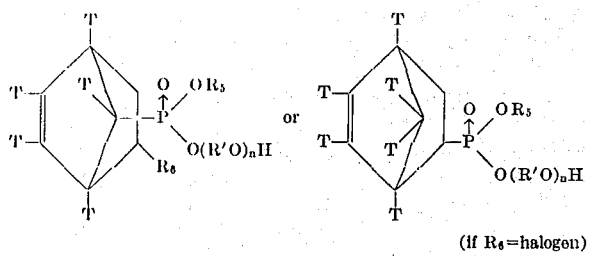

(if $R_6$=halogen)

where R' is as previously defined. Examples of such compounds within the invention are methyl hydroxypropoxypropyl 1,4,5,6,7-pentachloro-3-methyl-5-norbornene-7-phosphonate, 2-chloroethyl hydroxyethoxyethyl 1,4,5,6,7-pentachloro-3-ethyl-5-norbornene-7-phosphonate, 2-bromoethyl 4-hydroxybutyl 1,4,5,6,7-pentabromo-3-hexadecyl-5-norbornene-7-phosphonate, 3-chloropropyl hydroxypropoxypropyl 1,4,5,6,7-pentafluoro-3-bromo-5-norbornene-7-phosphonate, decyl hydroxypropoxypropyl 1,4,5,6,7-pentachloro-3-cyclohexyl-5-norbornene-7-phosphonate, 2-chloropropyl hydroxyethoxyethyl 1,4,5,6,7-pentachloro-3-chloro-5-norbornene-7-phosphonate.

Somewhat similar compounds are formed by reacting octachloronorbornadiene, octabromonorbornadiene or octafluoronorbornadiene with a tertiary phosphite $(R_5O)_3P$ followed by transesterification with a diol $HO(R'O)_nH$ to give phosphonates of the formula (when T is Cl)

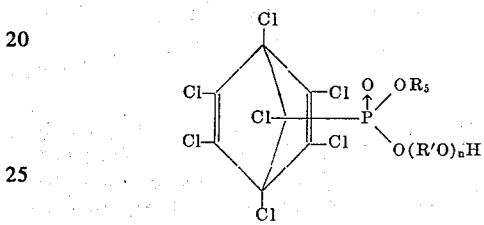

Examples of such phosphonates are butyl 4-hydroxybutyl 1,2,3,4,5,6,7-heptachloronorbornadiene-7-phosphonate, 2-chloroethyl hydroxyethoxyethyl 1,2,3,4,5,6,7-heptachloronorbornadiene-7-phosphonate, 3-bromopropyl hydroxypropoxypropyl 1,2,3,4,5,6,7-heptafluoronorbornadiene-7-phosphonate. Illustrative of the intermediates is dimethyl 1,2,3,4,5,6,7-heptachloronorbornadiene-7-phosphonate (also called 1,2,3,4,5,6,7-heptachloro-7-dimethoxyphosphono 2,5-norbornadiene).

As in the reaction with HEPT the initial alkyl or haloalkyl phosphonates of all the types described above are prepared by dissolving the halogenated norbornene (or norbornadiene) compound in xylene (or other inert solvent) and heating to reflux under nitrogen. The tertiary phosphite is added slowly dropwise and the $R_5Cl$ formed is removed as a gas. The product is then distilled to recover the phosphonate, either as a higher boiling fraction or by crystallization.

EXAMPLE 51

Dimethyl HEPT Phosphonate.

900.8 grams (2.5 moles) of HEPT and 1.2 liters of xylene were placed in a 3 necked flask at room temperature in a nitrogen atomosphere and heated with stirring. 372.3 grams (3.0 moles, a 20% excess) of trimethyl phosphite in 0.5 liters of xylene were added dropwise while the temperature in the flask rose from 73°C. to about 130°C. in 2 hours and 40 minutes. The mixture was cooled overnight and then reheated to 130°C. for about 5 hours. The xylene and other low boilers such as excess trimethyl phosphite were removed by distillation first at atmospheric pressure and then at the water pump. The residue was filtered hot through charcoal. The residue was a dark brown viscous liquid (about 1 liter) and was redissolved in about 300 ml. of hot xylene and 600 ml. of ether. The mixture was filtered over charcoal. The filtrate was still dark brown. The filtrate was concentrated to 1.2 liters and placed in a refrigerator at −17°C. The product did not crystallize.

393.2 grams was removed from the refrigerator and heated in a vacuum. 41 grams of distillate was obtained at 43.5°–72.5°C. at about 23 mm. This was discarded. The residue was vacuum distilled and 112.7 grams collected at 101°–131.5°C. and 0.3 to 2.5 mm.

Two more portions of the product were removed from the refrigerator and distilled in the manner just indicated to give a total of 320.1 grams of distillate product.

The product was then redistilled in a vacuum. Four cuts totaling 121.5 grams were collected at about 0.17–0.36 mm. and 78°–103.5°C. A fifth and main cut of 162.9 grams of yellow liquid mixed with white crystals was taken at about 0.2 to 0.45 mm. and 71°–101°C.

The liquid in the main cut after several months was decanted and vacuum distilled at 0.1 to 0.135 mm. to give a clear, colorless liquid with a white crystalline precipitate. The liquid portion had a B.P. of 100 to 102°C. at 0.10 to 0.13 mm. and analyzed C 26.96%, H 1.98%, Cl 50.14%, N 3.66%, P 6.17%. The product was dimethyl HEPT phosphonate and was designated CPNB, empirical formula $C_{10}H_8Cl_6O_3NP$.

EXAMPLE 52

11 grams (0.03 mole) of octachloronorbornadiene -2, 5 (a very pale yellow liquid B.P. 95°–100°C. at 0.40 mm.) and 30 ml. xylene (solvent) were placed in a flask and there was added 4.1 grams (about 0.033 mole) of trimethyl phosphite while a nitrogen atmosphere was maintained. The mixture was heated to reflux while allowing the methyl chloride formed to escape. Refluxing was continued for about 5.5 hours. Then xylene and volatiles were removed at the water pump and the unreacted octachloronorbornadiene removed under vacuum about 0.5 to 0.7 mm. The residue was 3.4 grams of a dark solid containing dimethyl 1,2,3,4,5,6,7-heptachloro-2,5-norbornadiene-7-phosphonate.

Pentaerythritol alkylene oxide adducts react with 3 moles of a tris(haloalkyl) phosphite to form a hexa(-haloalkyl) mono hydroxy alkyl pentaery-thritol triphosphite. The equation is as follows using Pluracol PEP 450 (adduct of pentaerythritol with 4 moles of propylene oxide having a molecular weight of about 400):

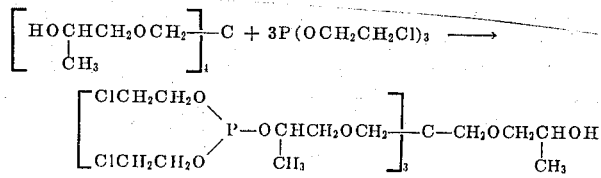

Thus there can be prepared hexa(2-chloroethyl) 2-hydroxypropyl pentaerythritol triphosphite, hexa(2-chloroethyl) hydroxyethyl pentaerythritol triphosphite, hexa(2-chloroethyl) 2-hydroxybutyl pentaerythritol triphosphite, hexa(2,3-dichloropropyl) 2-hydroxypropyl pentaerythritol triphosphite, hexa(2-chloropropyl) 2-hydroxypropyl pentaerythritol triphosphite, hexa-(3-chloropropyl) 2-hydroxypropyl pentaerythritol triphosphite, hexa(2-chloroethyl) 3-hydroxypropyl pentaerythritol triphosphite, hexa(2-fluororethyl)2-hydroxypropyl pentaerythritol triphosphite. The corresponding phosphonates and mixed phosphites-phosphonates are formed by heating the phosphites, e.g. to 140°C. Thus there are prepared penta(2-chloroethyl)2-hydroxypropyl 2-chloroethane pentaerythritol phosphonate diphosphite, tri(2-chloroethyl) 2-hydroxypropyl tri(2-chloroethane) pentaerythritol triphosphonate, penta(2-bromoethyl) 2-hydroxypropyl 2-bromoethane pentaerythritol phosphonate diphosphite. Normally in forming the pentaerythritolalkylene oxide adduct phosphites there will be formed a small amount of the phosphonate-phosphites and/or phosphonates.

EXAMPLE 53

100.0 grams (0.25 mole) of Pluracol PEP 450 and 202.1 grams (0.75 mole) of tris(2-chloroethyl) phosphite were mixed under a nitrogen atmosphere and heated up to 135°C. for 5 hours at 20–50 mm. to distill out 55.0 grams of 2-chloroethanol. The residue was a clear, colorless viscous liquid weighing 230.6 grams and was primarily hexa-(2-chloroethyl) tripropylene hydroxypropyl pentaerythritol triphosphite with a small amount of the isomeric phosphonate.

EXAMPLE 53a

The reaction was carried out as in Example 53 except that Pluracol PEP 450 was replaced by 0.25 mole of pentaerythritol. The product was hexa-(2-chloroethyl) hydroxypropyl pentaerythritol triphosphite, a nearly colorless, viscous liquid.

Maleic anhydride reacts with diols such as ethylene glycol, propylene glycol, 1,4-butylene glycol, 1,2-butylene glycol, diethylene glycol, dipropylene glycol, triethylene glycol on a mole for mole basis to give half esters, e.g. 2-hydroxyethyl hydrogen maleate, 2-hydroxypropyl hydrogen maleate, 2-hydroxypropyl hydrogen maleate, 3-hydroxypropyl hydrogen maleate, diethylene glycol hydrogen maleate, dipropylene glycol hydrogen maleate. These products react mole for mole with halogen containing tertiary phosphite to form halogen containing, monohydroxy succinate esters. A typical equation for the reactions is

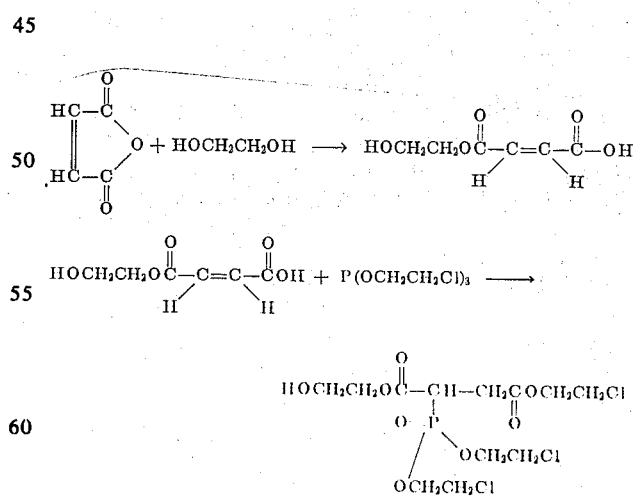

Typical starting phosphites are tris(2-chloroethyl) phosphite, tris(2-chloropropyl) phosphite, tris(2-bromoethyl)phosphite, tris(2-fluoroethyl) phosphite, tris(2,3-dichloropropyl) phosphite, tris(2,3-dibromoethyl) phosphite.

Examples of products of the invention are 2-hydroxyethyl 2-chloroetnyl di(2-chloroethyl) phosphonosuccinate (HCPS), 2-hydroxyethyl 2-bromoethyl di(2-bromoethyl) phosphonosuccinate, 2-hydroxyethyl 2,3-dichloropropyl) di(2,3-dichloropropyl) phosphonosuccinate, 2-2-fluoroethyl di(2-fluoroethyl) phosphonosuccinate, 2-hydroxypropyl 2-chloropropyl di(2-chloropropyl) phosphonosuccinate, diethylene glycol 2-chloroethyl di(2-chloroethyl) phosphonosuccinate, dipropylene glycol 2-bromoethyl di(2-bromoethyl) phosphonosuccinate, dipropylene glycol 3-bromopropyl di(3-bromopropyl) phosphonosuccinate, diethylene glycol 2,3-dichloropropyl di(2,3-dichloropropyl) phosphonosuccinate, dipropylene glycol 2,3-difluoropropyl di(2,3-difluoropropyl) phosphonosuccinate.

EXAMPLE 54

980.6 grams (10.0 moles) of maleic anhydride were dissolved in 620.7 grams (10.0 moles) of ethylene glycol and heated in a nitrogen atmosphere at 23° to 65°C. for 1.25 hours. An exotherm took the temperature to 69°C. The mixture was held at 60° to 72°C. for 2 hours with the aid of an ice-water bath and was then allowed to cool to room temperature. The acid number was 125.5 (theory 350). The mixture was heated again at 75°C. for three hours at which time the acid number had risen to 328. The mixture was heated an additional hour at 75°C. to get an acid number of 334. Heating was continued for 3 more hours at 75°C. The acid number was 314. The hydroxyl number was 745 (theory 745). The 2-hydroxyethyl hydrogen maleate was a clear yellow liquid and weighed 1,595.0 grams, C 45.84%, H 5.41%.

EXAMPLE 55

800.6 grams (5.0 moles) of 2-hydroxyethyl hydrogen maleate prepared in Example 54 was heated to 50°C. under a nitrogen atmosphere. There was added dropwise 1,347.5 grams of tris(2-chloroethyl) phosphite in 2 hours at 50°–80°C., the exotherm maintaining the temperature without external heating. Then the clear golden solution was heated at 100°C. for 8 hours. The acid number was now 1.5. The bright orange clear liquid was 2-hydroxyethyl 2-chloroethyl di(2-chloroethyl) phosphonosuccinate in a yield of 2,100 grams, analyzing C 34.20%, H 5.16%, Cl 24.62%, P 5.57%.

EXAMPLE 56

490.3 grams (5.0 moles) of maleic anhydride were mixed with 530.6 grams (5.0 moles) of diethylene glycol at 25°C. in a nitrogen atmosphere. The temperature dropped to 19°C. due to the endothermic reaction. Heating was begun to speed up the dissolution of the maleic anhydride. Complete dissolution occurred at 48°C. The temperature was then held at 60°–80°C. for 1 hour and then kept at 75°C. for 3 hours at which time the acid number was 286.1. The product was heated further at 75°C. for an additional 2.5 hours. The hydroxyethoxyethyl hydrogen maleate formed was a clear, golden yellowish orange liquid, acid number 272.2 (theory 274.8), and weighed 1,012.4 grams, hydroxyl number 546 (theory 609.5), C 46.82%, H 6.11%.

EXAMPLE 57

510.5 grams (2.5 moles) of hydroxyethoxyethyl hydrogen maleate prepared in Example 56 were placed under a nitrogen atmosphere. Then there were added dropwise 673.7 grams (2.5 moles) of tris(2-chloroethyl) phosphite at 50°–80°C. in 1.5 hours. The solution was heated to 100°C. for 2 hours at which time the acid number was 14.93. Heating was continued for 4.5 hours more at 100°C. to an acid number of 2.6 (theory is zero). The 2-hydroxyethoxyethyl 2-chloroethyl di(2-chloroethyl) phosphonosuccinate formed was a clear, viscous, pale orange liquid weighing 1,170.1 grams, C 35.31%, H 5.10%, Cl 22.42%, P 6.02%.

EXAMPLE 58

490.3 grams (5.0 moles) of maleic anhydride were mixed with 670.9 grams (5.0 moles) of dipropylene glycol at 25°C. in a nitrogen atmosphere. The temperature dropped to 20°C. during 15 minutes of stirring. The mixture was heated to 75°C. and held there for 2 hours. The acid number was 271.7 (theory 241.6). Heating was continued for 4.5 hours more at 75°C. to get an acid number of 247.2. The 2-hydroxypropoxypropyl hydrogen maleate obtained was a clear, viscous, pale orange liquid weighing 1,146.3 grams, hydroxyl number 428.8 (theory 545), C 51.52%, H 6.78%.

EXAMPLE 59

580.6 grams (2.5 moles) of 2-hydroxypropoxypropyl hydrogen maleate prepared in Example 58 were placed under a nitrogen atmosphere and 673.7 grams (2.5 moles) of tris(2-chloroethyl) phosphite added dropwise at 50°–70°C. in 1.5 hours. The mixture was then heated at 100°C. for 1 hour to an acid number of 14.48. The mixture was then heated for 4 more hours at 100°C. to an acid number of 5.56. The 2-hydroxypropoxypropyl 2-chloroethyl di(2-chloroethyl) phosphonosuccinate was a clear, golden yellow, viscous liquid weighing 1,240.1 grams, hydroxyl number 128.3 (theory 111.8), C 38.87%, H 5.97%, Cl 21.22%, P 5.07%.

An alternative method of preparation of bis(2-chloroethyl)hydroxypropoxypropyl phosphite, the product of Examples 3, 8, 14, 20 and 28 is given below. Similar compounds are prepared in an analogous manner, where R and R' each is alkylene, alkenylene, or substituted alkylene, e.g.,

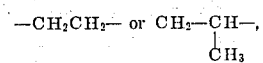

and X is Cl, Br or F in the following equation

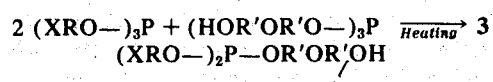

The heating to obtain the above exhange of ester groups is carried out usually at 80°–130°C. in order to complete this reaction but to minimize the rearrangement to the corresponding phosphonate. If the heating is continued for several hours in the range of 130° to 200°C., the following rearrangement takes place (gradually at lower temperatures, and rapidly at higher temperatures):

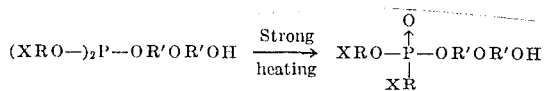

This general procedure for preparing numerous of the above-mentioned monool phosphites and phosphonates of this invention is illustrated by the following experimental example.

EXAMPLE 59a

One mole (430.5 grams) of tris(dipropylene glycol) phosphite (a colorless liquid), and two moles (539.0 grams) of tris(2-chloroethyl) phosphite (a colorless liquid prepared from two moles of phosphorus trichloride and six moles of ethylene oxide) were mixed at room temperature and heated for 9 hours under a nitrogen atmosphere in the temperature range of 80°C. to 130°C. After this period of time, the equilibration reaction (ester exchange) was essentially complete, and the liquid product mainly consisted of bis(2-chloroethyl) hydroxypropoxypropyl phosphite (100 percent yield, no losses). This was demonstrated by the high boiling point of the mixture, by the usual analytical data including the hydroxyl number, the iodine number, and the elementary analyses, and more specifically by the fact that the infrared spectrum and the observations of chromatography on this product did not differ appreciably from bis(2-chloroethyl) hydroxypropoxypropyl phosphite made by two different methods (see Examples 20 and 28). The product made in this manner was found to be useful fire retardant monool in fire retardant foam compositions. With only 0.5 percent P in the final rigid foam composition, the foam was self-extinguishing and had good physical properties.

The polyurethanes prepared using the monool phosphorus compounds of the present invention are useful in making both solid and foamed polyurethanes which are self-extinguishing or non-burning. Thus they can be used to form elastomeric threads, as shock absorbent filling for packages, sound insulation blocks, pipe insulation, upholstery filling material, carpet underlays, hair curlers, blankets, cigarette and pipe filters, pillows, building panels and other forms of insulation, textile linings, toys, cups, protective coatings for wood and steel.

Their greatest utility is in preparing both rigid and flexible polyurethane foams. In preparing polyurethanes there can be used the normal procedure of the preparation of a hydroxyl containing compound with a hydroxyl number between about 20 and 1000 usually 50 to 700 and thereafter reacting the hydroxyl containing compound with an organic polyisocyanate. The hydroxyl containing material is usually a polyether or a polyester as is well known in the art. The monool phosphite and phosphonates of the invention are usually used in an amount of 2 to 40 percent by weight of the total hydroxyl compounds but this can be varied. Since only relatively small amounts of the phosphorus monool are needed there is no significant chain termination.

The ratio of NCO/OH usually varies from 0.8-1.2 and is preferably 1.0-1.05:1.

As examples of organic polyisocyanates which can be used to make the polyurethanes there can be employed toluene-2,4-diisocyanate; toluene-2,6-di-isocyanate; 4-methoxy-1,3-phenylene diisocyanate; diphenyl methane-4,4'-diisocyanate; 4-chloro-1,3-phenylene diisocyanate; 4-isopropyl-1,3-phenylene diisocyanate; 2,4-diisocyanate-diphenylether; 3,3'-dimethyl-4,4'-diisocyanatodiphenyl methane; mesitylene diisocyanate; durylene diisocyanate; 4,4'-methylene bis(-phenylisocyanate); benzidine diisocyanate; 4,4'-diisocyanatodibenzyl; 3,3'-bitolylene-4,4'-diisocyanate; 1,5-naphthylene diisocyanate; cumene-2,4-diisocyanate; 9,10-anthracene diisocyanate; tetramethylene diisocyanate; hexamethylene diisocyanate; decamethylene diisocyanate; toluene-2,4,6-triisocyanate; tritolylmethane triisocyanate; 2,4,4'-triisocyanatodiphenyl ether; phenylene diisocyanate; o-, m-, and p-xylene diisocyanates.

The reaction product of toluene diisocyanate with trimethylolpropane at an NCO/OH ratio of 2:1 (Mondur CB); the reaction product of toluene diisocyanate with 1,2,6-hexanetriol at an NCO/OH ratio of 2:1; the reaction product of toluene diisocyanate with a polyol phosphite at an NCO/OH ratio of 2:1, e.g. when the polyolphosphite is dipropylene glycol tetrol diphosphite or tris-(dipropylene glycol phosphite); as well as polyisocyanates listed in Siefken (Annalen, Vol. 562, pages 122–135, 1949), can be used.

There can also be used polymethylene polyphenylisocyanate, molecular weight 380 to 400, having an isocyanate equivalent of 135 (maximum), a viscosity of 400 centipoises (maximum) at 25°C., a NCO content of 31 percent (minimum), an acid value (p.p.m. of $H^+$) of 200 (maximum). This material is sold commercially under the trademark PAPI. There can also be used bitolylene diisocyanate (TODI) and dianisidine diisocyanate (DADI).

PAPI is particularly useful in forming rigid polyurethane foams.

Also, there can be used Nacconate 4040, a commercial 2,4-toluenediisocyanate.

Alternatively, as the polyisocyanate there can be used prepolymers made by reacting one or more of the above polyisocyanates with a polyhydroxyl compound. The prepolymers should have terminal isocyanate groups. To insure this, it is frequently desirable to employ an excess of 5 percent or more of the polyisocyanate in forming the prepolymer.

Typical examples of such prepolymers having isocyanate end groups are those formed from toluene diisocyanate and polyhydroxy compounds. Unless otherwise indicated, in the illustrative examples a mixture of 80% 2,4-isomer and 20% 2,6-isomer of toluene diisocyanate was employed in making the prepolymer. Thus, there can be used the prepolymers from toluene diisocyanate and castor oil, toluene diisocyanate and blown linseed oil, toluene dissocyanate and the polyester of ethylene glycol, propylene glycol and adipic acid having a molecular weight of 1900 described in Example I of Kohrn U.S. Pat. No. 2,953,839, toluene diisocyanate and polytetramethylene glycol (1000 molecular weight), toluene diisocyanate and polypropylene glycol (molecular weight 2025), toluene diisocyanate and dipropylene glycol, toluene diisocyanate and LG-56 (glycerine propylene oxide adduct, molecular weight of 3000), hexamethylene diisocyanate and pentaerythritol, toluene diisocyanate and sucrose, toluene diisocyanate and polyethylene sebacate, toluene diisocyanate and a mixture of 98% polypropylene glycol molecular weight 1900 with 2% 1,2,6-hexanetriol, toluene diisocyanate and a copolymer of ethylene oxide and propylene oxide having a molecular weight of 2000, toluene diisocyanate and a mixture of polypropylene ether glycol molecular weight 995 and castor oil described in Example 2 of Kane U.S. Pat. No. 2,955,091, toluene diisocyanate and tris(dipropylene glycol) phosphite, toluene diisocyanate and tris(octakis(2-hydroxypropyl) sucrose) phosphite, toluene diisocyanate and dipropylene glycol hydroxy propoxypropene phosphonate.

As the polyol material there can be used compounds such as polyethylene glycols having molecular weights of 400 to 3000, polypropylene glycols having molecular weights of 400 to 3000, ethylene glycol, diethylene glycol, triethylene glycol, propylene glycol, dipropylene glycol, tripropylene glycol, 1,4-butanediol, thiodiglycol, glycerol, trimethylolethane, trimethylolpropane, ether triols from glycerine and propylene oxide having molecular weights of 1000 and 3000 (available commercially as LG-168 and LG-56, respectively), ether containing triols from 1,2,6-hexanetriol and propylene oxide having molecular weights of 750, 1500, 2400, and 4000 (available commercially as LHT 240, LHT 112, LHT 67 and LHT 42, respectively), sorbitolpropylene oxide adduct having a molecular weight of 1000, pentaerythritol-propylene oxide adduct having a molecular weight of 400 or 1000, trimethylol phenol, oxypropylated sucrose, triethanolamine, pentaerythritol, diethanolamine, castor oil, blown linseed oil, blown soya oil, N,N,N',N'-tetrakis (2-hydroxyethyl) ethylene-diamine, N,N,N',N'-(2-hydroxypropyl) ethylenediamine, mixed ethylene glycol-propylene glycol adipate resin (molecular weight 1900), polyethylene adipate phthalate, polyneopentylene sebacate, the product made by reacting an excess of 1,4-butanediol with adipic acid and including a small amount of triol, e.g., one molar equivalent of trimethylolpropane for each 3000 to 12,000 molecular weight units of polyester, polyester from 16 moles adipic acid, 16 moles diethylene glycol and 1 mole of trimethylolpropane, oxypropylated p-tertiary butylphenolformaldehyde resin of Example 2b of de Groote U.S. Pat. No. 2,499,365 and the other oxyalkylated resins of De Groote, tris(dipropylene glycol) phosphite, and tris(polypropylene glycol 2025) phosphite, as well as the polyols disclosed in U.S. Pat. Nos. 3,184,419; 3,194,773; 3,201,358; and 3,385,801.

Foamed polyurethanes can be obtained by adding water prior to or simultaneously with the addition of the organic polyisocyanate.

Alternatively, foams can be prepared by uniformly distributing a liquified halogen substituted alkane containing at least one fluorine atom in its molecule and which vaporizes at or below the temperature of the foaming mass. Such fluorine containing compounds include trichloromonofluoromethane, dichlorodifluoromethane, dichloromonofluoromethane, chlorodifluoromethane, trichlorotrifluoroethane, dichlorotetrafluoroethane and dichlorohexafluoropropane. The foams can be formed with such fluorine containing compounds in the manner described in General Tire British Patent No. 821,342 or Barnes U.S. Pat. No. 3,022,256. If desired, water can be used in conjunction with the liquified fluorine containing haloalkane. Volatile hydrocarbons such as pentane can also be employed as the expanding agent.

The foamed polyurethanes can be made by either the one shot or two step method.

In preparing the cured and/or foamed polyurethanes any of the conventional catalysts can be employed, e.g., sodium hydroxide, sodium methylate, sodium phenolate, tertiary amines, e.g. N-methyl morpholine, N-ethyl morpholine, 1,2,4-trimethylpiperazine, trimethyl amine, triethyl amine, tributyl amine and other trialkyl amines. The esterification product of 1 mole of adipic acid and 2 moles of diethyl ethanolamine, triethyl amine citrate, 3-morpholinopropionamide, 2-diethylamineacetamide, triethylene diamine, N,N,N',N'-tetrakis (2-hydroxypropyl) ethylene diamine, tribenzyl amine, N,N'-dimethylpiperazine, N,N-dimethyl hexahydroaniline, 2,2,1-diazabicyclooctane, 1,2-dimethylimidazole, arsenic trichloride, antimony pentachloride, titanium tetrachloride, dioctyl lead diacetate, octylene glycol titanate can be employed. There can also be used tin compounds having at least one direct carbon to tin valence bond, e.g. hydrocarbon tin acrylates such as dibutyltin dilaurate, dibutyltin dioctoate, tributyltin monolaurate, dimethyltin diacetate, dibutyltin maleate, hydrocarbon tin alkoxides, e.g. dibutyltin diethoxide and dibutyltin dimethoxide, octyl stannoic acid, trimethyltin hydroxide, trimethyltin chloride, triphenyltin hydridge, triallyltin chloride, tributyltin fluoride, dibutyltin dibromide, bis(carboethoxymethyl) tin diiodide, tributyltin chloride, trioctyltin acetate, butyltin trichloride, octyltin tris(thiobutoxide), dimethyltin oxide, stannous octanoate, dioctyltin oxide, diphenyltin oxide, stannous oleate, as well as the other tin compounds set forth in Hostettler French Patent No. 1,212,252 and Barnes U.S. Pat. No. 3,022,256.

There can also be used a small amount, e.g., 0.001 to 10% by weight of the total ingredients of a stabilizing or thickening agent, e.g. methoxylated cellulose, ethyl cellulose, hydroxyethyl cellulose, benzyl cellulose, cellulose acetate, cellulose acetate butyrate, hydroxyethyl polyvinyl alcohol, polyvinyl chloride, polymerized methyl methacrylate.

Fillers can be added in amounts up to 20 percent by weight, e.g., clay, diatomaceous earth, powdered aluminum and beryllium, vermiculite, cork, bark, foamed polystyrene, foamed polyethylene and foamed polypropylene can be used.

Conventional surfactants can be added in an amount of 0.1 to 5 percent by weight of the composition. Preferably, less than 1 percent, e.g. 0.2 percent, of surfactant is employed. The preferred surfactants are silicones, e.g., polydimethyl siloxane having a viscosity of 3 to 100 centistokes, trimethoxydimethyl polysiloxane molecular weight 850 copolymerized with a dimethoxypolyethylene glycol of molecular weight 750 as well as any of the other siloxanes disclosed in Hostettler French Patent No. 1,212,252 and the siloxane-oxyalkylene copolymers having from about 10 to 80 percent by weight of siloxane polymer and from 90 to 20 percent by weight of alkylene oxide polymer such as the copolymers described in U.S. Pat. No. 2,834,748.

EXAMPLE 60

Incorporation of Bis-(2-chloroethyl) Hydroxyethoxyethyl Phosphite (DEG-CEP) in a Rigid Polyurethane Foam at the Level of 0.8 percent phosphorus Content Bis-(2-chloroethyl) hydroxyethoxyethylphosphite, henceforth designated as DEG-CEP, the product of Example 2 above, was incorporated in a rigid polyurethane foam together with the following other ingredients listed below.

| General chemical nature of the ingredient | Specific name of the ingredient | Parts by weight |
|---|---|---|
| Propoxylated pentaerythritol (molecular weight, 400) or C(CH$_2$O—CH$_2$—CH—OH)$_4$<br>　　　　　　　　　　　　　　　　　　｜<br>　　　　　　　　　　　　　　　　　　CH$_3$ | Pluracol PEP 450 | 94.20 |
| Phosphorous-containing monool (fire retardant) | DEG-CEP (the product of Example 2 containing 10.6% of phosphorus). | 23.01 |
| Fluorinated compound (blowing agent) | Trichlorofluoromethane | 37.53 |
| Polysiloxane copolymer (surfactant) | L-5320 (Union Carbide product) of the type disclosed in U.S. patent 2,834,748, specifically. | 1.62 |
| Organic tin compound (catalyst) | Dibutyltin dilaurate | 1.62 |
| Polyisocyanate containing 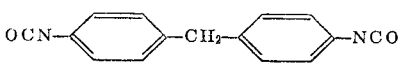 as well as smaller amounts of its dimers and trimers. | Methylene diphenylene-4,4'-diisocuanate; (Mondur MRS). | 142.02 |
| Total ingredients (parts) | | 300.00 |

These ingredients were combined to produce a rigid, self-extinguishing polyurethane foam in the following manner. The polyol (in this case, the propoxylated pentaerythritol) and the fire retardant phosphorus-containing monool (in this example, DEG-CEP) were mechanically mixed and cooled in an ice bath. The blowing agent (CFCl$_3$) was added with stirring, and the mixture was cooled in a freezer section of a refrigerator for one minute. This solution was blended with a mixture of the surfactant (the polysiloxane copolymer) and of the polyisocyanate for 10 seconds in a Waring blender, with the variac controlling the speed of the blender being set at 68 units. The resulting blend was poured into a polyethylene mold which had been pre-coated with a mold-release agent. In this particular experiment, a thin layer of "Pride" wax was used as the mold-release agent on the polyethylene surface. However, it was found in other experiments that other materials (e.g., polypropylene, ABS resins (acrylonitrile-butadiene-styrene resins) or metals) were also useful as mold forms, and other mold-release agents (e.g., relatively high molecular weight solid hydrocarbons) could be successfully used to pre-coat the surface of the mold form.

After the blended mixture was poured into the mold form, it formed a rigid foam of fine structure, with strong, closed cells, in a short period of time. The rise of the foam was accompanied by a slight exotherm. After cooling to room temperature, the foam (containing 0.8 percent chemically bound phosphorus and 1.84 percent of chlorine) was cut in pieces and was tested for its fire retardance, physical properties, and dimensional stability both immediately after preparation as well as after various periods of aging (heating in a dry and in a humid atmosphere). The testing results are given below in Table 1, together with the sensing results of several oter rigid foams.

In example 60 in place of L-5320 there can be used either (a) trimethoxydimethyl polysiloxane molecular wieght 850 copolymerized with dimethoxypolyethylene glycol of molecular weight 750 or (b) polydimethyl siloxane with similar results.

EXAMPLE 61

Incorporation of 2-Chloroethyl Hydroxyethoxyethyl Trichloromethanephosphonate (DEG-CEP) in a Rigid Polyurethane Foam at the Level of 0.5 percent P.

As described in Example 4, equimolar amounts of bis (2-chloroethyl) hydroxyethoxyethyl phosphite or DEG-CEP and of carbon tetrachloride were reacted to form a nearly colorless, liquid product designated as DEG-CEP, the principal ingredient of which was 2-chloroethyl hydroxyethoxyethyl trichloromethanephosphonate. The iodine number of the product was near zero indicating an almost complete rearrangement of the phosphite to the phosphonate structure. DEG-CEPT was incorporated in a rigid polyurethane foam by the procedure described above in Example 60. There wre, however, some difference in the composition of the foam. The following ingredients were used in Example 61.

| General chemical nature of the ingredient | Specific name of the ingredient | Parts by weight |
|---|---|---|
| Propoxylated pentaerythritol | Pluracol PEP 450 | 98.40 |
| Phosphorus-containing monool (fire retardant) | DEG-CEPT (the product of Example 4 containing 8.85% phosphorus). | 16.95 |
| Blowing agent | CFCl$_3$ | 37.53 |
| Surfactant | L-5320 | 1.62 |
| Catalyst | Dibutyltin dilaurate | 1.62 |
| Polyisocyanate | Mondur MRS | 143.88 |
| Total ingredients (parts) | | 300.00 |

The rigid polyurethane foam of this example had a similar appearance to that of Example 60; the color of the foam was nearly white, the same as that of the control in the absence of the phosphorus compound, and it had a fine, closed, uniform cellular structure. The physical properties of the foam of Example 61 are given in Table 1 below. The foam contained 0.5 percent of phosphorus, 2.29 percent of chlorine, and it was self-extinguishing, with a burning rate of 3.2"/ minute (flammability test ASTM-D-1692-59T).

EXAMPLE 62

Incorporation of DEG-CEPT in a Rigid Polyurethane Foam at the Level of 1 percent P In order to achieve a further decrease of the burning rate of the foam upon ignition, in this example a higher percentage of the same phosphorus-containing monool (DEG-CEPT) was employed in a foam composition than in Example 61. The following ingredients were used in Example 62, with the procedure of mixing being the same as described in Example 60.

| General chemical nature of the ingredient | Specific name of the ingredient | Parts by weight |
|---|---|---|
| Propoxylated pentaerythritol | Pluracol PEP 450 | 88.50 |
| Phosphorus-containing monool (fire retardant) | DEG-CEPT (the product of Example 4) | 33.90 |
| Blowing agent | CFCl₃ | 37.53 |
| Surfactant | L-5320 | 1.62 |
| Catalyst | Dibutyltin dilaurate | 1.62 |
| Polyisocyanate | Mondur MRS | 136.83 |
| Total ingredients (parts) | | 300.00 |

A rigid polyurethane foam was produced which contained 1.0 percent of chemically bound phosphorus and 4.58 percent of chlorine. It was very similar in its appearance and physical properties to the foam described in Example 61. However, due to the higher level of the fire retardant elements (phosphorus and chlorine) in the foam of Example 62, the burning rate upon ignition was lower (1 1/6 inch/min.). Both foams were self-extinguishing. The physical properties of the foam of Example 62 are given in Table 1.

EXAMPLE 63

Incorporation of 2-Chloroethyl Hydroxyethoxyethyl 2-Chloroethane-phosphonate (DEG-CEPT) in a Rigid Polyurethane Foam at the Level of 0.5 percent P As described in Example 19, a nearly colorless, fire retardant, liquid product, henceforth briefly designated as DEG-CET, was prepared by heating bis (2-chloroethyl) hydroxyethoxyethyl phosphite (DEG-CEP) with a relatively small amount of ethylene dichloride. Only a catalytic amount of 1,2-dichloroethane was required because this compound is regenerated during the reaction, since this is a self-rearrangement. As shown in Example 19, the principal ingredient of the product (DEG-CET) was 2-chloroethyl hydroxyethoxyethyl 2-chloroethanephosphonate. This product was incorporated in a rigid polyurethane foam by the procedure described in Example 60 above.

The materials employed in Example 63 to make the foam are set forth below.

| General chemical nature of the ingredient | Specific name of the ingredient | Parts by weight |
|---|---|---|
| Propoxylated pentaerythritol | Pluracol PEP 450 | 99.60 |
| Phosphorus-containing monool (fire retardant) | DEG-CET (the product of Example 19 containing 10.69% of phosphorus) | 14.28 |
| Blowing agent | CFCl₃ | 37.53 |
| Surfactant | L-5320 | 1.62 |
| Catalyst | Dibutyltin dilaurate | 1.62 |
| Polyisocyanate | Mondur MRS | 145.35 |
| Total ingredients (parts) | | 300.00 |

A rigid, self-extinguishing foam of excellent physical properties was obtained, as reported in Table 1.

EXAMPLE 64

Incorporation of DEG-CET in a Rigid Polyurethane Foam at the Level of 1 percent P In a similar manner to that in Example 63, DEG-CET was incorporated in a rigid polyurethane foam. However, in exampel 64 a larger proportion of DEG-CET was used, so that the final phosphorus content of the foam was 1 percent. The foam was non-burning. The ingredients of the foam are listed below, and the testing result are given in Table 1.

| General chemical nature of the ingredient | Specific name of the ingredient | Parts by weight |
|---|---|---|
| Propoxylated pentaerythritol | Pluracol PEP 450 | 91.50 |
| Phosphorus-containing monool (fire retardant) | DEG-CET (the product of Example 19 containing 10.69% P) | 28.56 |
| Blowing agent | CFCl₃ | 37.53 |
| Surfactant | L-5320 | 1.62 |
| Catalyst | Dibutyltin dilaurate | 1.62 |
| Polyisocyanate | Mondur MRS | 139.17 |
| Total ingredients (parts) | | 300.00 |

EXAMPLE 65

Incorporation of DEG-CET in a Rigid Polyurethane Foam at the Level of 0.5 percent P after Six Months of Aging In Example 63 above, the incorporation of DEG-CET (the product of Example 19) in a rigid polyurethane foam was described; the preparation of the foam containing 0.5 percent P was carried out a few days after the synthesis of DEG-CET. In order to check the storage stability of DEG-CET, the product of Example 19 was stored in a transparent, closed jar at room temperaure in the usual artificial light of a laboratory for six months. No attempt was made to replace the air by nitrogen or any other inert gas in the jar before the storage period. After this period, the stored sample of DEG-CET did not show any observable changes in appearance, color, odor, viscosity, or other properties.

The aged sample DEG-CET was incorporated in a rigid polyurethane foam by the same procedure and with exactly the same amounts of all ingredients as in Example 63. The physical properties of the foam containing freshly made DEG-CET (Table 1, Example 63) and aged DEG-CET (Table 1, Example 65) were similar. Both foams were self-extinguishing, and both contained 0.5 percent of phosphorus. The conclusion was that the aging process did not deteriorate the properties of DEG-CET.

Example 66

Incorporation of DEG-CET in a Rigid Polyurethane Foam at the Level of 1.0 percent P After Six Months of Aging Another sample of DEG-CET (the product of Example 19) was aged by the same procedure as described in Example 65 for six months. Again, no changes of the product were apparent.

This sample of aged DEG-CET was incorporated in a rigid polyurethane foam by the same procedure as described in Example 64, and exactly the same amounts of ingredients were used. The physical properties of the foam containing freshly made DEG-CET (Table 1, Example 64) and aged DEG-CET (Table 1, Example 66) were similar. Both foams contained 1 percent by weight of chemically bound phosphorus. The foam from freshly made DEG-CET was non-burning (i.e., immediately self-extinguishing after removal of the flame used in the test), and the foam containing aged DEG-CET was self-extinguishing with a low buring rate (2.04 inches per minute). Therefore, the differences of the self-extinguishing character of the two foams were minor and almost insignificant.

TABLE 1.—RIGID POLYURETHANE FOAMS BASED ON PHOSPHORUS-CONTAINING MONO-(HYDROXYETHOXYETHYL) ESTERS AS FIRE RETARDANTS

| Ex. No. | Component F.R. | Percent by wt. | Percent, P | Percent, Cl | Compressive strength, p.s.i. | | | | | | Dimensional stability | | | | | | Den. lb./ft.3 | Flamm. ASTM D 1692-59T |
|---|---|---|---|---|---|---|---|---|---|---|---|---|---|---|---|---|---|---|
| | | | | | 70° C., 100% R.H. | | | 100° C., dry | | | 70° C., 100% R.H. | | | 100° C., dry | | | | |
| | | | | | 1 day | 7 day | 14 day | 1 day | 7 day | 14 day | 1 day | 7 day | 14 day | 1 day | 7 day | 14 day | | |
| 60 | DEG-CEP | 7.62 | 0.8 | 1.84 | 22.15 | 20.84 | 24.10 | 25.83 | 21.49 | 24.40 | 2.82 | 2.26 | 3.86 | −0.22 | 0.50 | 1.69 | 2.03 | S.E. 1.5″. |
| 61 | DEG-CEPT | 5.65 | 0.5 | 2.29 | 22.06 | 22.87 | 21.60 | 18.49 | 17.91 | 22.42 | 1.52 | −0.62 | −0.83 | −1.05 | 1.53 | 2.28 | 2.41 | S.E. 3.2″. |
| 62 | DEG-CEPT | 11.30 | 1.0 | 4.58 | 20.77 | 18.13 | 22.67 | 19.70 | 19.23 | 20.33 | 1.15 | 1.91 | −0.26 | 1.37 | 1.53 | −2.87 | 2.53 | S.E. 1 1/16″. |
| 63 | DEG-CET | 4.76 | 0.5 | 1.14 | 20.10 | 24.65 | 28.73 | 19.44 | 25.51 | 21.74 | 1.26 | −0.84 | −0.93 | 2.59 | 5.25 | 4.32 | 1.91 | S.E. 1 7/8″. |
| 64 | DEG-CET | 9.52 | 1.0 | 2.28 | 20.89 | 24.22 | 26.27 | 22.98 | 20.11 | 21.03 | −0.17 | −0.63 | 1.64 | 2.01 | 3.27 | 3.19 | 2.08 | N.B. |
| 65 | DEG-CET [1] | 4.76 | 0.5 | 1.14 | 19.30 | 23.13 | 24.13 | 21.13 | 20.98 | 20.19 | 1.15 | 2.60 | 4.43 | 2.73 | 3.42 | 4.33 | 3.94 | S.E. 4.38″. |
| 66 | DEG-CET [1] | 9.52 | 1.0 | 2.28 | 24.65 | 21.29 | 22.00 | 24.25 | 20.71 | 20.22 | 1.06 | 2.44 | 3.81 | 3.15 | 4.12 | 4.89 | 2.28 | S.E. 2.04″. |

[1] Repeat evaluation after 6 months aging (Examples 65 and 66).

NOTE.—S.E.=Self-Extinguishing (with the burning length in inches per minute given); N.B.=Non-burning; F.R.=Fire Retardant; R.H.=Relative Humidity.

EXAMPLE 67

The First Control

A control rigid polyurethane foam without any fire retardant monool components was prepared in the manner described in Example 60. As expected, this control foam was not self-extinguishing. The sample of the foam continued to burn readily after ignition at the rate of 6 inches per minute.

The physical properties of this control sample are given below in Table II, Example 67. A comparison of the properties with those of the self-extinguishing or non-burning foams of this invention (Examples 60 to 66 inclusive) shows that the foams made from the phosphorus-containing monools (as one of the ingredients) combine the excellent physical properties and dimensional stability of the control (Example 67) with the additional advantage of strong fire retardance.

The ingredients of the foam of this control example 67 are listed below.

| General Chemical Nature of the Ingredient | Specific Name of the ingredient | Parts by Weight |
|---|---|---|
| Propoxylated pentaerythritol | Pluracol PEP 450 | 108.31 |
| Blowing agent | CFCl₃ | 37.53 |
| Surfactant | L-5320 | 1.62 |
| Catalyst | Dibutyltin dilaurate | 1.62 |
| Polyisocyanate | Mondur MRS | 150.93 |
| Total Ingredients | | 300.00 |

EXAMPLE 68

The Second Control Containing A Different Polyol

A rigid polyurethane foam without any fire retardant monool phosphorus compounds was made with a different polyol. Instead of propoxylated pentaerythritol as in Example 67 (and the preceding examples) there was used a propylene oxide adduct of a hexitol, specifically the industrial product Atlas 2408A. This known product is a polyol with the average of about 6 hydroxyl groups per molecule; it is a straw-colored liquid with the density of 9.2 lbs/gallon, and the hydroxyl number 555, the equivalent weight of 101, and the viscosity of 20,100 cps. at 25° C. It is a propoxylated sorbitol.

As expected, the control foam sample of this Example 68 burned readily at the rate of 5 inches per minute. It was not self-extinguishing. The preparation of the control foam was performed similarly as in Example 60, except that the fire retardant phosphorus-containing monool was absent in the control foam. The ingredients of the control foam of Example 68 are listed below.

| General Chemical Nature of the Ingredient | Specific Name of the Ingredient | Parts by Weight |
|---|---|---|
| A propoxylated hexitol | Atlas 2408-A | 108.15 |
| Blowing agent | CFCl₃ | 37.53 |
| Surfactant | L-5320 | 1.62 |
| Catalyst | Dibutyltin Dilaurate | 1.62 |
| Poyisocyanate | Mondur MRS | 151.08 |
| Total Ingredients | | 300.00 |

The properties of the second control foam (Example 68) containing Atlas 2408-A as the polyol are listed in Example 68, Table II.

The propoxylated pentaerythritol used as the conventional polyol in Example 60 to 66 inclusive can be replaced by other conventional polyols such as a propoxylated hexitol (Atlas 2408-A), as well as any of the other polyols set forth earlier in the specification. The application of the novel fire retardant monools is not limited to any particular polyol or any particular polyisocyanate as the other principal ingredients of the polyurethane foams, but instead any of the conventional polyisocyanates, polyols and other ingredients for making polyurethane foams can be employed. The propoxylated hexitol (Atlas 2408-A) in such foam compositions has the advantage of a greater degree of branching and therefore a somewhat greater cross-linking density than Pluracol PEP 450 which contributes to the dimensional stability and the fire retardance of the foam composition. In contrast, the foams containing propoxylated pentaerythritol (e.g., Example 67) have a slightly higher density than those containing propoxylated hexitol (e.g., Example 68, see Table II). Besides, propoxylated pentaerythritol had a better compatibility with the other ingredients of the foams than propoxylated hexitol.

In summary, both propoxylated pentaerythritol and propoxylated hexitol, as well as numerous other knonw,

TABLE II.—CONTROLS FOR EXAMPLES IN TABLE 1

| Ex. No. | Principal reactants | Percent of by wt. F.R. | Percent. P | Percent. Cl | Compressive strength, p.s.i. 70° C., 100% R.H. | | | 100° C., dry | | | Dimensional stability 70° C., 100% R.H. | | | 100° C., dry | | | Density lb./ft.³ | Flammability ASTMD 1692-59T |
|---|---|---|---|---|---|---|---|---|---|---|---|---|---|---|---|---|---|---|
| | | | | | 1 day | 7 day | 14 day | 1 day | 7 day | 14 day | 1 day | 7 day | 14 day | 1 day | 7 day | 14 day | | |
| 67 | Control, PEP 450+ Mondur MRS. | None | None | None | 24.48 | 24.07 | 26.71 | 27.40 | 25.83 | 27.43 | 1.75 | 1.20 | 0.90 | 1.62 | 2.32 | 3.03 | 2.37 | 6.0″/min.[1] |
| 68 | Control, Atlas 2408-A+ Mondur MRS. | None | None | None | 27.5 | 33.4 | 25.5 | 25.2 | 27.2 | 27.58 | 0.30 | 1.25 | 2.24 | 0.94 | 0.25 | 3.46 | 2.22 | 5″/min.[1] |

[1] Burned.

conventional polyols, are suitable as co-reactants with the phosphorus-containing monools of this invention. The hydroxyl groups of the conventional polyols as well as the single hydroxyl group of the P-containing monool react with the isocyanate groups of the polyisocyanate to form a cross-linked, three-dimensional network of a polyurethane foam.

EXAMPLE 69

Incorporation of Bis (2-chloroethyl) Hydroxypropoxypropyl Phosphite (DPG-CEP) in a Rigid Polyurethane Foam at the Level of 0.5 percent Phosphorus Content The principal product of Example 3, bis (2-chloroethyl) hydroxypropoxypropyl phosphite, a very pale yellow liquid henceforth designated as DPG-CEP, was incorporated in a rigid self-extinguishing polyurethane foam by an analogous procedure to that described in Example 60. There were two major differences: (1) the fire retardant monool was different (DEG-CEP in Example 60, and DPG-CEP in Example 69), and (2) the final percent phosphorus content of the polyurethane foam was lower in Example 69 (0.5 percent) than in Example 60 (0.8 percent) Other minor differences of the ratios of ingredients will be evident from the following list of ingredients for the foam of Example 69.

| General chemical nature of the ingredient | Specific name of the ingredient | Parts by weight |
|---|---|---|
| Propoxylated pentaerythritol | Pluracol PEP 450 | 98.88 |
| Phosphorus-containing monool (fire retardant). | DPG-CEP (the product of Example 3 containing 8.87% P and 20.30% Cl). | 15.66 |
| Blowing agent | CFCl₃ | 37.53 |
| Surfactant | L-5320 | 1.62 |
| Catalyst | Dibutyltin dilaurate | 1.62 |
| Polyisocyanate | Mondur MRS | 144.69 |
| Total ingredients (parts) | | 300.00 |

The physical properties of the foam are listed below in Table III, Example 69.

EXAMPLE 70

Incorporation of DPG-CEP in a Rigid Polyurethane Foam at 0.5 percent Phosphorus Level After Six Months of Aging A sample of DPG-CEP was prepared by the procedure described in Example 3 and then was aged for six months by storing it in a closed transparent glass jar at the usual lighting conditions of a laboratory (artifical neon lights) and at room temperature (about 25° C). After this period of time, there were no observable differences in the appearance, color, odor, and viscosity of DPG-CEP. This aged product was incorporated into a polyurethane foam composition by the precedure described in Example 60. There were the following major differences:

a. The fire retardant monool was different in Example 70;

b. The fire retardant monool was aged for 6 months in Example 70, whereas a freshly prepared fire retardant monool had been used in Examples 60 and 69;

c. The final phosphorus content (0.5 percent) was lower in Example 70 than in Example 60 (0.8 percent);

d. The conventional polyol (a propoxylated hexitol) in Example 70 was different than the one used in Examples 60 and 69 (a propoxylated tetrol).

Other minor differences will be apparent from the following list of reactants used to prepare the foam of Example 70.

| General chemical nature of the ingredient | Specific name of the ingredient | Parts by weight |
|---|---|---|
| A propoxylated hexitol | Atlas 2408-A | 99.00 |
| Phosphorus-containing monool (fire retardant). | DPG-CEP (the product of Example 3 aged for 6 months before its use in the foam). | 15.66 |
| Blowing agent | CFCl₃ | 37.53 |
| Surfactant | L-5320 | 1.62 |
| Catalyst | Dibutyltin dilaurate | 1.62 |
| Polyisocyanate | Mondur MRS | 144.57 |
| Total ingredients (parts) | | 300.00 |

The fact that the physical properties of the foam (see Table III, Example 70) from the aged sample of DPG-CEP did not differ appreciably from the properties of the foam containing freshly made DPG-CEP (Table III, Example 69) confirmed the excellent storage stagility of DPG-CEP.

EXAMPLE 71

Incorporation of 2-Chloroethyl Hydroxypropoxypropyl Trichloromethanephosphonate (DPG-CEP) in a Rigid Polyurethane Foam at the Level of 0.5 percent Phosphorus.

By the procedure described in Example 31, equimolar amounts of bis (2-chloroethyl) hydroxypropoxypropyl phosphite (DPG-CEP) and of carbon tetrachloride were heated, with distillation of about the equimolar amount of 2-chloroethanol as a by-product, to form a liquid, colorless main product in the residue designated henceforth as DPG-CEPT; the principal component of this product was 2-chloroethyl hydroxypropoxypropyl trichloromethanephosphonate. The iodine number of DPG-CEPT was near zero indicating a virtually complete rearrangement to phosphonate.

A rigid, self-extinguishing polyurethane foam was prepared a few days after the synthesis of this sample of DPG-CEPT, with the latter as the fire retardant component of the foam. The ingredients of the foam are given below.

| General chemical nature of the ingredient | Specific name of the ingredient | Parts by weight |
|---|---|---|
| A propoxylated hexitol | Atlas 2408-A | 97.86 |
| Phosphorus-containing monool (fire retardant). | DPG-CEPT (the product of Example 31 containing 8.9% of chemically bound phosphorus). | 16.98 |
| Blowing agent | CFCl$_3$ | 37.53 |
| Surfactant | L-5320 | 1.62 |
| Catalyst | Dibutyltin dilaurate | 1.62 |
| Polyisocyanate | Mondur MRS | 144.39 |
| Total ingredients (parts) | | 300.00 |

The physical properties of this foam are reported below (Table III, Example 71).

EXAMPLE 72

Incorporation of DPG-CEPT in a Rigid Polyurethane Foam at 0.5 percent P Level After Aging for Six Months A sample of DPG-CEPT was prepared by the procedure described in Example 31 and then was aged for six months by storing it in a closed, transparent jar exposed to the artificial light of a laboratory at about 25° C. After this period of time, the aged sample of DPG-CEPT was incorporated in a rigid polyurethane foam composition. The foam was made by the general working procedure described in Example 60, but the formulas and the amounts of ingredients were exactly the same as in Example 71. The only difference was that the sameple of DPG-CEPT used in Example 71 was freshly made, whereas the DPG-CEPT sample used in the foam of Example 72 had been aged for 6 months.

Both foams of Examples 71 and 72 had an excellent appearance (nearly white; small, closed cells, strong and not brittle). Some numerical physical properties are reported in Table III. From the data reported in Table III it is evident that the aging process of DPG-CEPT for 6 months had no appreciable effects on its utility as a very effective fire retardant of polyurethane foams. The compressive strength of the foam of Example 72 was almost equal to that of Example 71 after various periods of aging in humid or dry, hot atmospheres, and both foams were self-extinguishing. The dimensional stability of both foams was excellent. In a few cases of experimental measurements of dimensional stability, the foam of Example 71 (from fresh DPG-CEPT) shows small negative values (indicating a slight shrinkage instead of expansion upon humid aging of the foam), whreas the foam of Example 72 showed only small positive values of dimensional stability in Table III (indicating only a slight expansion upon dry aging or humid aging of the foam; no shrinkage was observed in any case of experimental measurement, and this is considered to be a desired factor for many practical applications of the foam).

In summary DPG-CEPT as a fire retardant foam monomer showed an excellent storage stability for the period of at least six months after its preparation.

Example 73

Incorporation of 2-Chloroethyl Hydroxypropoxypropyl 2-Chloroethanephosphonate (DPG-CEPT) in a Rigid Polyurethane Foam at the Level of 0.5 percent Phosphorus Bis (2-chloroethyl) hydroxypropoxypropyl phosphite (DPG-CEP) was rearranged in the presence of a catalytic amount of 1,2-dichloroethane to 2-chloroethyl hydroxypropoxypropyl 2-chloroethanephosphonate (henceforth briefly designated as DPG-CEPT) as the principal product in the residue, while recovered 1,2-dichloroethane as removed by distillation. This rearrangement was carried out by the procedure reported in Example 9 above. The iodine number of DPG-CET was near zero indicating an almost complete rearrangement of the phosphite to the phosphonate. A few days after its preparation, DPG-CET was incorporated into a rigid, self-extinguishing polyurethane foam at the level of 0.5 percent of chemically bound phosphorus by the general procedure reported in Example 60. The principal differences between the two examples (60 and 73) are the following:

a. A different fire retardant phosphorus containing monool was used;

b. A different conventional, known polyol was used (a propoxylated tetrol in Example 60 and a propoxylated hexitol in Example 73);

c. In example 73, the final phosphorus content of the foam (0.5 percent) was lower than in Example 60 (0.8 percent).

Other minor differences between the two examples as to the ratios of reactants will be apparent from the following list of ingredients for the foam of Example 73.

| General chemical nature of the ingredient | Specific name of the ingredient | Parts by weight |
|---|---|---|
| A propoxylated hexitol | Atlas 2408-A | 98.85 |
| Phosphorus-containing monool (fire retardant). | DPG-CET (the product of Example 9 containing 9.5% of phosphorus and 21.91% of chlorine). | 15.66 |
| Blowing agent | CFCl$_3$ | 37.53 |
| Surfactant | L-5320 | 1.62 |
| Catalyst | Dibutyltin dilaurate | 1.62 |
| Polyisocyanate | Mondur MRS | 144.72 |
| Total ingredients (parts) | | 300.00 |

Some physical properties of the foam of this example have been tabulated below (Table III, Example 73). Especially notable are the following properties of the foam:

a. Very good appearance and color (nearly white, hard, not brittle, small and closed cells);

b. Excellent compressive strength (Table III, Example 73), at least equivalent to, or even slightly superior to, the compressive strength (before and after humid or dry aging of the foam) found for the control samples in the absence of any fire retardants (Table II, Examples 67 and 68 above);

c. Very little shrinkage upon humid aging at 70° C. and very little expansion upon dry aging at 100° C. (see Table III for the numerical values);

d. The polyurethane foam of Example 73 is non-burning; i.e., the fire is extinguished immediately upon withdrawal of the gas flame during ignition tests performed with this foam; this desirable property is achieved consistently with an unusually low content (0.5 percent) of phosphorus (in the chemical form of a phosphonate ester) bound in the foam through a urethane linkage.

The following chemical equation partially represents the reaction which takes place during the formation of the foam in a generalized way; this is not the only one reaction possible, since the polyfunctionality of the raw materials leads to numerous possible analogs and isofoams and they are considerably less effective as fire retardants of polyurethanes, and/or their application results in foams of inferior quality and dimensional stability compared to the foams of this invention (Examples 60 to 74, inclusive) which have excellent properties.

The general structural formulas of dialkyl hydroxyalkyl phosphites (A) and alkyl hydroxyalkyl alkanephosphonates (B) are shown below. Extensive experimental work has shown that the compounds of the structures (A) and (B) are considerably less effective as fire retardants for foams that the compounds of the present invention, especially bis-(haloalkyl) hydroxyalkyl phosphites (C) and haloalkyl hydroxyalkyl haloalkanephosphonates (D). In particular, none of the compounds of the types (A) and (B) gave a self-extinguishing foam at the level of 0.5 percent phosphorus, but the foams with 1 percent or more phosphorus had poor physical properties (i.e., they had insufficient dimensional stability upon aging in a humid atmsophere at 70° C. or in a dry atmsophere at 100° C. for one to several days).

In contrast, all compounds tested of the types (C) and (D) gave self-extinguishing or non-burning foams at 0.5 percent phosphorus level with good to excellent physical properties (such as the compressive strength and dimensional stability upon aging).

The marked difference in the practical utility of the types (C) and (D) versus the less useful types (A) and (B) is believed due to the presence of at least two halogen atoms in (C) or (D) which furnish additional fire retardance (besides the fire retardant effect of the phosphorus atom). For this reason, self-extinguishing properties are achieved with only 0.5 percent P in rigid foams and 1 percent P in flexible foams. In contrast, larger amounts of (A) and (B) are required for sufficient fire retardance; if larger amounts are used, the utility of (A) and (B) decreases because of other considerations such as insufficient hydrolytic and thermal stability of the resulting foams. Therefore, there is a basic difference in the utility of the preferred types (C) and (D) versus the types (A) and (B) in foams.

In the above formulas A through D, R is an alkyl group and $R^1$ is an alkylene group; neither R nor $R^1$ contains any substituted halogen atoms; Y is an alkylene group, or more generically, a hydrocarbon residue with the functionality of $n + 1$, where $n$ is the integer determining the number of halogen atoms attached to Y; since n is at least one, the functionality of Y is at least 2 (in the simplest case, Y is alkylene). X is a halogen atom, and R'' is an alkylene group (or, more generically, a divalent hydrocarbon group including arylene) or a plurality of divalent hydrocarbon groups having hetero atoms such as oxygen linking the hydrocarbon groups in a chain so that R'' can be —Y—O Y—, for example, ethoxyethyl, propoxypropyl, etc.

The basic difference in the utility of compounds of the types (A) and (B) and some other types of phosphorus compounds from types (C) and (D) of this invention is evident from experimental results in Table V. With the types (A) and (B), it was impossible to prepare a self-extinguishing polyurethane foam with good or excellent physical properties for reasons explained above (insufficient fire retardance on 0.5% P level; detrimental effects on physical properties on higher levels of phosphorus content in the foams).

With some other type of phosphorus compounds such as (E) or (F), it was possible to prepare self-extinguishing foams; however, the application of (E) resulted in a lower compressive strength of the foam, and with (F) as an unreactive additive the foam had a poor dimensional stability upon aging at an elevated temperature in humid and dry atmospheres. Therefore, (E) and (F) turned out to be less useful than the foams of this invention based on the preferred types of fire retardants (C) and (D).

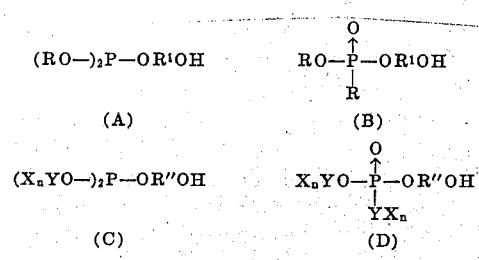

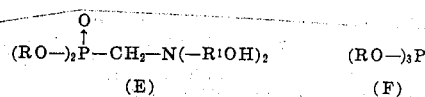

A list of various phosphorus compounds employed (for purposes of comparison with the preferred compounds of this invention) in polurethane foams is provided in Table IV. The testing results of these foams are reported in Table V below.

TABLE IV.—OTHER TYPES OF PHOSPHORUS COMPOUNDS TESTED IN RIGID POLYURETHANE FOAMS FOR THE PURPOSE OF COMPARISON WITH THE PREFERRED TYPES OF THIS INVENTION

| Example No. | General type of compound | Name of the phosphorus compound | Percent by weight of the phosphorus comp. used in foam | Percent of phosphorus in the foam |
|---|---|---|---|---|
| 75 | (E) | Dialkyl N,N-bis(hydroxyethyl)aminomethanephosphonate | 4.12 | 0.5 |
| 76 | (E) | ....do.... | 7.4 | 0.9 |
| 77 | (F) | Triphenyl phosphite | 13.3 | 0.5 |
| 78 | (F) | Tris(ethyl)phosphite | 8.04 | 1.5 |
| 79 | (A) | Bis-(n-decyl)triethylene glycol phosphite | 8.00 | 0.5 |
| 80 | (A) | Bis-(n-hexyl)2-butene-1,4-diol phosphite | 5.18 | 0.5 |
| 81 | (A) | ....do.... | 10.36 | 1.0 |
| 82 | (A) | Diphenyl hydroxypropoxypropyl phosphite | 5.65 | 0.5 |
| 83 | (A) | ....do.... | 11.30 | 1.0 |
| 84 | (B) | Triethylene glycol n-decyl n-decanephosphonate | 16.00 | 1.0 |
| 85 | (B) | Ethyl hydroxyethoxyethyl ethanephosphonate | 3.65 | 0.5 | mers, i.e., to a considerable variability in the three-dimensional, cross-linked polyurethane foam network. For this particular example, X is Cl;

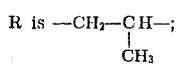

R' is —CH$_2$—CH$_2$—; Ar is —C$_6$H$_4$—CH$_2$—C$_6$H$_4$—; R'' is the hexafunctional aliphatic residue of sorbitol and n is an integer.

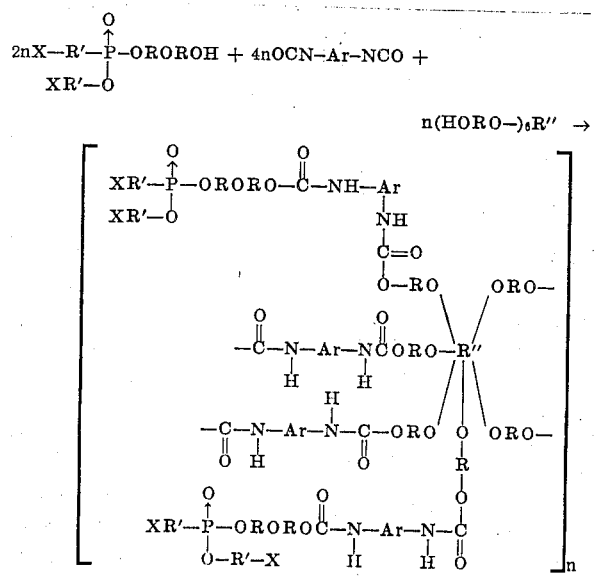

It is clear from the simplified formula above that a sufficient amount of cross-linking for a three-dimensional network of the foam is provided by the conventional polyol (in this particular case, a propoxylated hexitol, therefore, hexafunctional) and by the polyisocyanate (even if only difunctional) so that the monofunctional phosphorus-containing compound does not stop the chain growth even when the molar ratio of the fire-retardant monool to the hexafunctional polyol is 2:1 or somewhat higher (i.e. an equivalent ratio of about 1:3).

This conclusion, based upon the chemical equation and the theoretical considerations concerning the nature of the reactants discussed above, was confirmed by actual observations. A sufficient cross-linking density was obtained despite the fact that the phosphorus compound was a monool and, therefore, would be expected to have a chain-stopping effect; the foam of Example 73 had excellent physical properties (see Table III, below).

EXAMPLE 74

Incorporation of DPG-CET in a Rigid Polyurethane Foam at the Level of 0.5% P after Six Months of Aging A sample of DPG-CET was prepared by the procedure described in Example 9 above and then was aged for six months by storing it in a capped, transparent glass jar at room temperature and at the usual lighting conditions of a laboratory (large neon lights). After this period of storage, the sample of DPG-CET (which had shown no visible change) was incorporated in a self-extinguishing, rigid polyurethane foam. The chemical nature and the amounts of materials for the foam were exactly the same as in Example 73. The only difference was that DPG-CET utilized for the foam of Example 73 had been freshly made, whereas the sample of DPG-CET used in Example 74 had been aged for 6 months as described above.

Both foams of Examples 73 and 74 had a very good appearance and could not be distinguished visually. Upon weathering in a humid and dry atmosphere at 100°C., both foams behaved very similarly and showed good stability (see Examples 73 and 74, Table III above). The foam of Example 73 was a little more stable (showed less expansion) upon dry aging and had a slightly higher compressive strength, but this difference was very close to the average experimental error (the uncertainty of measurement).

The conclusion follows that the storage for six months had very little effect on the utility of DPG-CET as a useful fire retardant for polyurethane foams.

EXAMPLES 75 – 85

Other Types of Phosphorus Compounds as Fire Retardants for Polyurethane Foams

In order to evaluate better the utility of the compounds of this invention (especially the bis-haloalkyl hydroxyalkyl phosphites, haloalkyl hydroxyalkyl haloalkane-phosphonates and haloalkyl hydroxyalkyl hexachloronorbornenephosphonates) as fire retardants for polyurethane foams, the foams based on these novel fire retardants were compared not only with combustible foams made in the absence of fire retardants (see Table II above), but also with foams containing other types of phosphorus compounds (see Tables IV and V below). While some of the other types of phosphorus compounds considered here (in Examples 75–85) as fire retardants may be novel compounds, especially some having the structure of dialkyl hydroxyalkyl phosphites and alkyl hydroxyalkyl alkanephosphonates, they are not a part of this invention in developing compounds to be used as fire retardants of polyurethane TABLE III. RIGID POLYURETHANE FOAMS BASED ON PHOSPHORUS-CONTAINING MONO-(HYDROXYPROPOXYPROPLY) ESTERS AS FIRE RETARDANTS

| Ex. No. | Fire retard. compound | Per-cent by wt. | Per-cent P | Per-cent Cl | Compressive strength, p.s.i. | | | | | | Dimensional Stability | | | | | | Den. lb./ft.$^3$ | Flamm. ASTMD 1692-59T |
| | | | | | 70° C., 100% R.H. | | | 100° C., dry | | | 70° C., 100% R.H. | | | 100° C., dry | | | | |
| | | | | | 1 day | 7 day | 14 day | 1 day | 7 day | 14 day | 1 day | 7 day | 14 day | 1 day | 7 day | 14 day | | |
| 69 | DPG-CEP | 5.22 | 0.5 | 1.15 | 20.80 | 26.40 | 24.80 | 21.50 | 28.60 | 25.20 | 0.12 | 2.20 | 1.77 | 3.29 | 1.15 | 8.07 | 2.05 | S.E. 3⅛". |
| 70 | DPG-CEP* | 5.22 | 0.5 | 1.15 | 20.36 | 22.74 | 24.49 | 22.64 | 25.58 | 26.42 | 0.11 | 2.07 | 1.95 | 4.85 | 3.36 | 7.64 | 2.03 | S.E. 0.99". |
| 71 | DPG-CEPT | 5.66 | 0.5 | 1.72 | 25.52 | 30.60 | 30.25 | 25.35 | 30.02 | 28.52 | −0.41 | −1.15 | −1.15 | 1.65 | 2.62 | 0.61 | 2.33 | S.E. 1.5". |
| 72 | DPG-CEPT* | 5.66 | 0.5 | 1.72 | 22.28 | 24.78 | 26.35 | 24.02 | 26.93 | 27.15 | 0.92 | 1.06 | 1.04 | 2.08 | 3.65 | 3.25 | 2.18 | S.E. 2.92". |
| 73 | DPG-CET | 5.22 | 0.5 | 1.15 | 25.00 | 30.88 | 29.32 | 25.13 | 29.00 | 28.82 | −0.53 | −1.53 | −1.17 | 1.74 | 0.34 | 2.34 | 2.31 | N.B. |
| 74 | DPG-CET* | 5.22 | 0.5 | 1.15 | 20.31 | 23.69 | 25.43 | 20.00 | 23.56 | 27.05 | 0.21 | 0.88 | 2.04 | 0.88 | 8.02 | 6.28 | 2.05 | S.E. 0.81". |

* Repeat evaluation after 6 months of aging of the fire retardant monool (Examples 70, 72, and 74).

The phosphorus compounds of the types mentioned in Table IV were prepared in the following manner. The compounds of the type (E), dialkyl N,N-bis-(hydroxyalkyl) aminomethanephosphonates, were made from dialkyl phosphites, formaldehyde, and bis-(hydroxyalkyl-)amines by a general reaction known in the art (some compounds of this type are available commercially). Several triaryl phosphites were made from phenol and naphthol derivatives and phosphorus trichloride. While only a single example of a triaryl phosphite is shown in Example 77, other triaryl phos- These phosphorus compounds were incorporated in rigid polyurethane foams by the method described in Example 60 above. The conventional polyol (propoxylated pentaerythritol), the polyisocyanate, and the other ingredients were the same as in Example 60. The only major difference was that a different phosphorus compound was used in each example. The names and the amounts of phosphorus compounds used in the foams are listed above in Table IV. The testing results of the foams of the same examples (75 – 85 inclusive) are reported below in Table V.

TABLE V.—TESTING RESULTS OF RIGID POLYURETHANE FOAMS CONTAINING PHOSPHORUS COMPOUNDS OTHER THAN THE PREFERRED COMPOUNDS OF THIS INVENTION (FOR THE NAMES OF PHOSPHORUS COMPOUNDS, SEE TABLE IV)

| | Compressive strength, p.s.i. | | | | | | Dimensional stability | | | | | | Den. lb./ft.[3] | Flamm. ASTM-D 1692-59T |
|---|---|---|---|---|---|---|---|---|---|---|---|---|---|---|
| | 70° C., 100% R.H. | | | 100° C., dry | | | 70° C., 100% R.H. | | | 100° C., dry | | | | |
| | 1 day | 7 day | 14 day | 1 day | 7 day | 14 day | 1 day | 7 day | 14 day | 1 day | 7 day | 14 day | | |
| Example No.: | | | | | | | | | | | | | | |
| 75 | 26.69 | 28.26 | 27.01 | 21.58 | 27.58 | 21.77 | −0.42 | −1.52 | −1.70 | 1.85 | 2.09 | 7.39 | 2.08 | S.E. 2.5″. |
| 76 | 19.16 | 19.81 | 19.21 | 18.23 | 18.82 | 18.81 | 0.64 | 1.79 | 9.07 | 0.50 | 1.38 | 1.43 | 1.83 | S.E. 1³⁄₁₆″. |
| 77 | 18.13 | 17.42 | 18.29 | 18.04 | 16.97 | 18.73 | 1.59 | 0.78 | 2.67 | 3.67 | 4.38 | 3.66 | 2.14 | S.E. 0.7″. |
| 78 | 11.3 | | 15.1 | 8.4 | | 11.0 | 20.12 | | 55.44 | 30.58 | | 14.17 | | N.B. |
| 79 | | | | | | | | | | | | | | Burn. 2.6″. |
| 80 | | | | | | | | | | | | | | Burn. 2.6″. |
| 81 | | | | | | | | | | | | | | Burn. 2.7″. |
| 82 | | | | | | | | | | | | | | Do. |
| 83 | 15.30 | | | 14.58 | | | 7.57 | | | 17.39 | | | 2.06 | S.E. 2.1″. |
| 84 | | | | | | | | | | | | | | Burn. 2.8″. |
| 85 | | | | | | | | | | | | | | Burn. 4.2″. | phites behaved similarly. Trialkyl phosphites are available commercially. Only a single testing result (with triethyl phosphite, Example 78) is reported, but several other phosphites behaved similarly in rigid polyurethane foams.

Bis-(n-decyl) triethylene glycol phosphite was made from equimolar amounts of tris-(n-decyl)phosphite and triethylene glycol, by heating the mixture at a reduced pressure and distilling the equimolar amount of n-decanol formed by the transesterification reaction. The desired dialkyl hydroxyalkyl phosphite formed the liquid residue of this distillation.

Similarly, equimolar amounts of tris-(n-hexyl) phosphite and 2-butene-1,4-diol were reacted at an elevated temperature and a reduced pressure to form an equimolar amount of n-hexyl alcohol which was removed by distillation; the residue consisted of bis-(n-hexyl)2-butene-1,4-diol phosphite which was characterized by its iodine number and elementary analyses.

Diphenyl hydroxypropoxypropyl phosphite was prepared in quantitative yield by transesterification of triphenyl phosphite with dipropylene glycol and removal by distillation of the equimolar amount of phenol; the residue of distillation consisted of the desired diaryl hydroxyalkyl phosphite, as demonstrated by elementary analyses and the iodine number.

Bis-(n-decyl)triethylene glycol phosphite was heated with n-decyl chloride; in the Michaelis-Arbuzov reaction there was formed triethylene glycol n-decyl n-decane-phosphonate, and the recovered n-decyl chloride was removed by distillation.

Triethyl phosphite was transesterified with an equimolar amount of diethylene glycol to form the equimolar amount of ethanol (removed by distillation) and diethyl hydroxyethoxyethyl phosphite, a colorless liquid, in the residue of distillation. This phosphite was reacted with ethyl bromide to form ethyl hydroxyethoxyethyl ethanephosphonate by a self-rearrangement reaction; recovered ethyl bromide was removed by distillation.

In each of Tables I, II, III and V the following tests, conditions and results were noted:

Compressive Strength — was determined by the ASTM test D1621-59T and expressed in psi (lbs./in.$^2$).

R.H. — is relative humidity.

Dimensional stability — was determined by the ASTM test D2126-62T and expressed as percent volume change (positive numbers indicate percent expansion and negative numbers indicate percent shrinkage).

FLAMM. — Flammability of the foam determined by the ASTM test D 1692-59T.

N.B. — non-burning (the best result), i.e., the fire is immediately extinguished upon removal of the gas flame from the foam.

S.E. self-extinguishing (i.e., the fire on the foam is extinguished, but not immediately).

BURN. — burning; the foam burns readily, and the fire is not extinguished until the piece of foam is consumed by flames.

Distance — (in inches) after "S.E." in the last vertical column indicates the length of the foam sample burned per minute, i.e., the burning rate; the best foams have the slowest burning rate, and for "N.B." foams the burning rate is zero.

Dash — In the case that certain parameters were not determined, this is indicated by a dash in the appropriate place in Table V. The reasons why some parameters were not determined were the following. If the foam burned readily (Examples 79–82 and 84–85), there was no point in determining the physical properties since the objective of a fire retardant foam was not achieved. If the foam had poor compressive strength or dimensional stability already after 1 day of aging (Examples 78 and 83), there was no need to complete all measurements.

DISCUSSION OF RESULTS IN TABLE V

The foams of Examples 75 and 76 were self-extinguishing. However, on 0.5 percent P level (Example 75) the dimensional stability was not as good as obtained by using the products of this invention (see Tables I and III). In particular, at 70° C. and 100 percent relative humidity of the atmosphere, the foam of Example 75 showed some (although slight) shrinkage which is not desirable for practical reasons of application, and at 100° C. in a dry atmosphere the foam of Example 75 showed slightly more than the usually acceptable volume expansion (up to 3 percent expansion is considered to be acceptable for numerous practical applications).

The foam of Example 76 has a relatively low compressive strength (below 20) as compared to the self-extinguishing foams of this invention after aging the foams for 14 days in humid and dry atmospheres and at an elevated temperature.

Thus, the foams of Examples 75 and 76, although better than other foams of Table V, were not as good as the foams from the preferred products of this invention (Tables I and III). The conventional foams (controls) of Table II had good physical properties, but they burned readily.

The foams containing tertiary aromatic phosphites were self-extinguishing in some cases, but they had too low compressive strength.

The foam containing n-decyl triethylene glycol n-decanephosphonate was very friable, with large, non-uniform cell structure.

The other foams reported in Table V either were not self-extinguishing, or had poor physical properties, or both. By a comparison to the foams of Table V, it is evident that the foams of Tables I and III, based on the products of this invention, are exceptionally stable to the testing conditions in dry and humid atmospheres at elevated temperatures and constitute a considerable improvement over the self-extinguishing, rigid polyurethane foams previously known in the art. The self-extinguishing property can be achieved with an unusually low percent of phosphorus in the foam (consistently 0.5 percent; for some compositions even with 0.25 percent P).

The Incorporation of the Fire Retardant Compounds of this Invention in Flexible Polyurethane Foams Flexible foams of the individual examples given below were all prepared by the following procedure. All ingredients except toluene-diisocyanate (TDI) were premixed at room temperature and stirred for 2 minutes with a "Lightnin" mechanical mixer. Then TDI was added; the composition was mixed for 8 to 10 seconds and poured into a cardboard box lined with blue wax paper. The latter acted as a mold release. The curing was accomplished at 100° C for 15 minutes in a circulating air oven. The foams were cooled to room temperature and tested; the testing results were reported in Table VI below.

The ingredients of the individual flexible foams are described by the following examples.

EXAMPLE 86

Flexible Foam with 1% P, Containing DPG-CEP
555.00 parts by weight —glycerine-propylene oxide adduct, hydroxyl No. 56, molecular weight 3000 (Niax Polyol LG-56)
22.20 parts by weight —Water (blowing agent)
104.40 parts by weight —DPG-CEP (the product of Example 3)
7.70 parts by weight —L-520 (polysiloxane copolymer, a surfactant made by UNION CARBIDE)
1.30 parts by weight—N-ethylmorpholine (catalyst)
0.60 parts by weight—Tetramethyl 1,3-butanediamine (catalyst)
1.90 parts by weight—Stannous octoate (catalyst)
307.00 parts by weight—TDI (toluene diisocyanate)
1000.10 parts by weight—TOTAL INGREDIENTS

EXAMPLE 87

Flexible Foam with 2% P, Containing DEG-CEP
479.5 parts by weight—Niax Polyol LG-56
19.20 parts by weight—Water
190.6 parts by weight—DEG-CEP (the product of Example 2)
7.7 parts by weight—L-520 (Surfactant)
1.3 parts by weight—N-ethylmorpholine (NEM)
0.6 parts by weight—Tetramethyl butanediamine (TMBD)
1.9 parts by weight —Stannous octoate (SO)
299.3 parts by weight—Toluenediisocyanate (TDI)

EXAMPLE 88

Flexible Foam with 1.0% P, Containing DPG-CEPT
555.00 parts by weight—Niax Poyol LG-56
22.00 parts by weight—Water
113.00 parts by weight—DPG-CEPT (the product of Example 31)
7.7 parts by weight—L-520
1.30 parts by weight—NEM
0.60 parts by weight—TMBD
1.90 parts by weight—SO
304.7 parts by weight—TDI

EXAMPLE 89

Flexible Foam with 1% P, Containing DPG-CET
555.00 parts by weight—Niax Polyol LG-56
22.2 parts by weight—Water
104.4 parts by weight—DPG-CET (the product of Example 9)
7.7 parts by weight—L-520
1.3 parts by weight—NEM
0.6 parts by weight—TMBD
1.9 parts by weight—SO
307.0 parts by weight—TDI

EXAMPLE 90

Flexible Foam with No Phosphorus and No Fire Retardant Additive (Control)
642.0 part by weight—Niax Polyol LG-56
25.7 parts by weight—Water
7.7 parts by weight—L-520
1.3 parts by weight—NEM
0.6 parts by weight—TMBD
1.9 parts by weight—SO
321.0 parts by weight—TDI As is evident from the testing results, the flexible foams characterized in the above examples and in Table VI below combined excellent physical properties with an additional advantage (Example 86 to 89, inclusive): self-extinguishing properties. As expected, the control foam (Example 90) burned readily.

In Table VI below, BBY signifies "break before yield." The numerical value refers to the tensile strength of the foam reached before the break. It indicates that the sample of the foam broke before the yield point in the curve of stress versus time was reached.

The yield point is the value on the stress-time curve at which there is a reduction in tensile strength, i.e., at which the foam flows or gives into the stress.

The low values of the indentation load deflection observed for the control as well as for the sample are probably due to the small disc (12.5 in²) employed for the evaluation in Table VI ("Testing of Flexible Foams"). At a later date, a disc of the proper area (50 in²) was obtained, and for another series of samples with and without fire retardants higher values of indentation load deflection were found (of the order of magnitude of 40 psi. at 25 percent deflection and 75 psi. at 65 percent deflection).

TABLE VI.—TESTING OF FLEXIBLE FOAMS

| | Example Number | | | | |
|---|---|---|---|---|---|
| | 86 | 87 | 88 | 89 | 90 |
| Sample number of the flexible foam | 598-48-1 | 598-52-2 | 598-51-1 | 598-53-2 | 598-55-2 |
| Brief designation of the fire retardant monool used | DPG-CEP | DEG-CEP | DPG-CEPT | DPG-CET | (¹) |
| Density (lb./ft.³) | 1.82 | 2.08 | 1.64 | 1.72 | 1.51 |
| Tensile strength (lb./in.²) | 10.7 BBY | 10.3 BBY | 9.7 BBY | 16.7 BBY | 11.5 BBY |
| Tear strength (lb./in.) | 2.0 | 1.4 | 1.7 | 2.4 | 1.7 |
| Elongation, percent | 390.0 | 215.0 | 275.0 | 415.0 | 240.0 |
| Indentation load—Deflection (p.s.i.): | | | | | |
| At 25% deflection | 4.5 | 5.7 | 7.0 | 3.0 | 4.2 |
| At 65% deflection | 9.4 | 11.8 | 15.1 | 9.2 | 7.5 |
| Compression set after subjecting for 22 hours to 156° F.: | | | | | |
| Percent set at 50% compression | 36.3 | 42.1 | 14.9 | 28.2 | 11.5 |
| Percent set at 90% compression | 98.4 | 87.1 | 17.1 | 30.3 | 9.1 |
| Flammability (ASTM D1692-59T) | (²) | (³) | (⁴) | (⁵) | (⁶) |
| Percent P in the flexible foam | 1.0 | 2.0 | 1.0 | 1.0 | None |
| Percent Cl in the flexible foam | 2.29 | 4.48 | 2.47 | 2.16 | None |
| Percent fire retardant Monool | 10.44 | 19.06 | 11.30 | 10.44 | None |

¹ None (control foam).
² S.E. 1¾" 12 sec.
³ S.E. 1⁹⁄₁₆" 10 sec.
⁴ S.E. 2⅛" 19 sec.
⁵ S.E. 2½₆" 15 sec.
⁶ Burned 4.5"/min.

What is claimed is:

1. A compound having one of the formulae

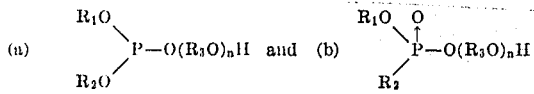

where $R_1$ and $R_2$ are selected from the group consisting of halo lower alkyl, halo lower alkenyl, halocyclohexyl having the phosphorus attached either directly or through oxygen to a ring carbon atoms, halocycloalkenyl having 6 carbon atoms in a ring and having the phosphorus atom attached directly or through oxygen to a ring carbon atom, halophenyl and halonaphthyl, $R_3$ is a lower alkylene or halo lower alkylene group having two to six carbon atoms and $n$ is an integer from 1 to 4 inclusive, all halogens having an atomic weight up to 80.

2. A compound according to claim 1 having formula (a).

3. A compound according to claim 2 wherein $R_1$ and $R_2$ are haloalkyl of one to eight carbon atoms.

4. A compound according to claim 3 wherein $R_1$ and $R_2$ are haloalkyl of two to three carbon atoms, and $R_3$ is alkylene of two to three carbon atoms, there are one to two halogen atoms on each alkyl group and $n$ is an integer not over 3.

5. A compound according to claim 4 which is bis(2-chloroethyl) hydroxyethoxyethyl phosphite.

6. A compound according to claim 4 in which is bis(2-chloroethyl) hydroxypropoxypropyl phosphite.

7. A compound according to claim 4 which is bis(2,3-dichloropropyl) hydroxypropoxypropyl phosphite.

8. A compound according to claim 3 which is bis(2-chloroethyl) 2-hydroxy-3-chloropropyl phosphite.

9. A compound according to claim 4 which is bis(2,3-dichloropropyl) hydroxyethoxyethyl phosphite.

10. A compound according to claim 4 which is bis(2-chloropropyl) hydroxyethoxyethyl phosphite.

11. A compound according to claim 1 having formula (b).

12. A compound according to claim 11 wherein $R_1$ and $R_2$ are haloalkyl of one to eight carbon atoms.

13. A compound according to claim 12 wherein $R_1$ is haloalkyl of two to three carbon atoms, $R_2$ is haloalkyl of one to three carbon atoms and $R_3$ is alkylene of two to three carbon atoms, there are one to two halogen atoms on $R_1$ and one to three halogen atoms on $R_2$ and $n$ is an integer not over 3.

14. A compound according to claim 13 which is 2-chloroethyl hydroxyethoxyethyl trichloromethane phosphonate.

15. A compound according to claim 13 which is 2-chloroethyl hydroxyethoxyethyl 2-chloroethane phosphonate.

16. A compound according to claim 13 which is 2-chloroethyl hydroxpropoxypropyl trichloromethane phosphonate.

17. A compound according to claim 13 which is 2-chloroethyl hydroxypropoxypropyl 2-chloroethane phosphonate.

18. A compound according to claim 13 which is 2,3-dichloropropyl hydroxypropoxypropyl 2,3-dichloroethane phosphonate.

19. A compound according to claim 13 which is 2-chloropropyl hydroxyethoxyethyl 2-chloropropane phosphonate.

20. A compound according to claim 13 which is 2-chloropropyl hydroxyethoxyethyl trichloromethane phosphonate.

21. A compound according to claim 13 which is 2-chloropropyl hydroxypropoxypropyl trichloromethane phosphonate.

22. A compound according to claim 1 wherein the halo lower alkyl group has one to eight carbon atoms and the halo lower alkenyl group is haloallyl.

23. A compound according to claim 22 wherein at least one of $R_1$ and $R_2$ is halocycloalkenyl.

24. A compound according to claim 23 wherein the halocycloalkenyl is a polyhalobicycloalkenyl group.

25. A compound according to claim 24 wherein the halocycloalkenyl is halo-norbornenyl.

26. A compound having one of the formulae:

(a) 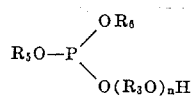

and (b) 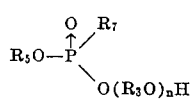

where $R_5$ is polyhalobicycloalkenyl having as part of the bicycloalkenyl ring system a cyclohexene ring and having the phosphorus atom attached through the oxygen atom to a ring carbon atom, $R_6$ is alkyl of one to 10 carbon atoms, phenyl, alkenyl of three to four carbon atoms, tolyl, haloalkyl of one to eight carbon atoms, haloallyl, halophenyl or halonaphthyl, $R_7$ is alkyl of one to 10 carbon atoms, haloalkyl of one to eight carbon atoms or haloallyl, $R_3$ is lower alkylene of two to six carbon atoms and $n$ is an integer of one to four.

27. A compound according to claim 26 having formula (a).

28. A compound according to claim 27 wherein $R_6$ is halo lower alkyl.

29. A compound according to claim 28 wherein $R_5$ includes a polyhalocyclohexenyl group.

30. A compound according to claim 29 wherein $R_3$ has 2 to 3 carbon atoms and $n$ is 2.

31. A compound according to claim 30 wherein $R_5$ is 1,4,5,6,7,7-hexachloro-5-norbornen-2-yl.

32. A compound according to claim 26 having formula (b).

33. A compound according to claim 32 wherein $R_6$ is halo lower alkyl.

34. A compound according to claim 33 wherein $R_5$ includes a polyhalocyclohexenyl group.

35. A compound according to claim 34 wherein $R_3$ has two to three carbon atoms and $n$ is 2.

36. A compound according to claim 35 wherein $R_5$ is 1,4,5,6,7,7-hexachloro-5-norbornen-2-yl.

* * * * *

UNITED STATES PATENT OFFICE
CERTIFICATE OF CORRECTION

Patent No. 3,758,646  Dated September 11, 1973

Inventor(s) Nicodemus H. Boyer

It is certified that error appears in the above-identified patent and that said Letters Patent are hereby corrected as shown below:

Cancel the original printed columns 1 through 64 and substitute the corrected columns 1 through 64.

Signed and sealed this 5th day of November 1974.

(SEAL)
Attest:

McCOY M. GIBSON JR.  C. MARSHALL DANN
Attesting Officer    Commissioner of Patents